Dec. 13, 1927.

G. D. PARKER 1,652,373

AUTOMATIC BOX MAKING MACHINE

Filed Sept. 25, 1923     12 Sheets-Sheet 4

Inventor
George D. Parker
By
Acker & Totten
Attys

Dec. 13, 1927.  
G. D. PARKER  
1,652,373  
AUTOMATIC BOX MAKING MACHINE  
Filed Sept. 25, 1923   12 Sheets-Sheet 5
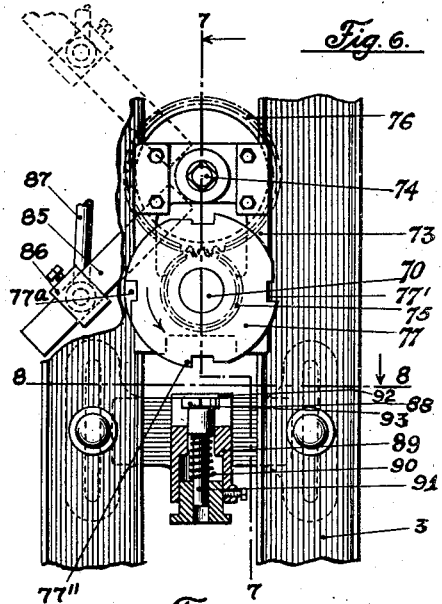
Fig. 6.
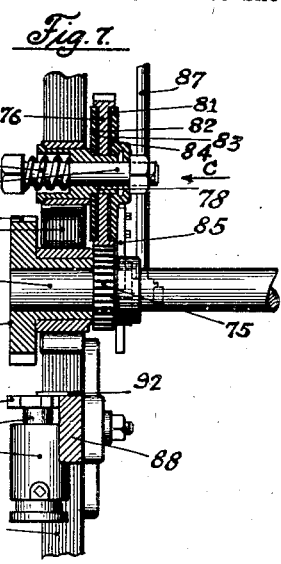
Fig. 7.
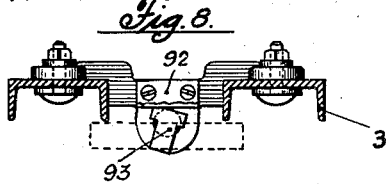
Fig. 8.
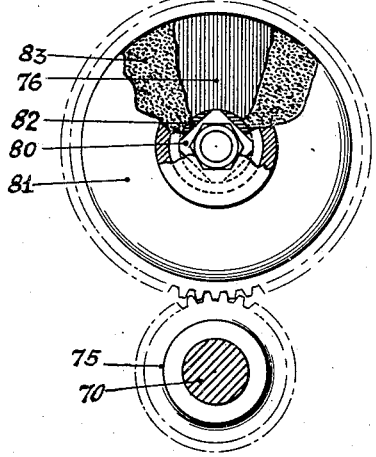
Fig. 11.
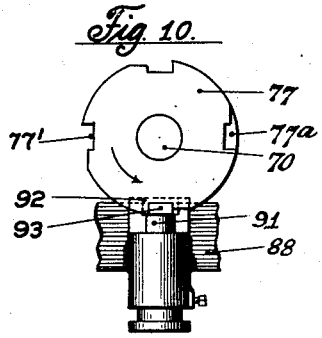
Fig. 9.
Fig. 10.
Inventor  
By George D. Parker  
Acker & Totten  
Attys.

Dec. 13, 1927.　　　　　　　　　　　　　　　　　　1,652,373
G. D. PARKER
AUTOMATIC BOX MAKING MACHINE
Filed Sept. 25, 1923　　　　12 Sheets-Sheet 6
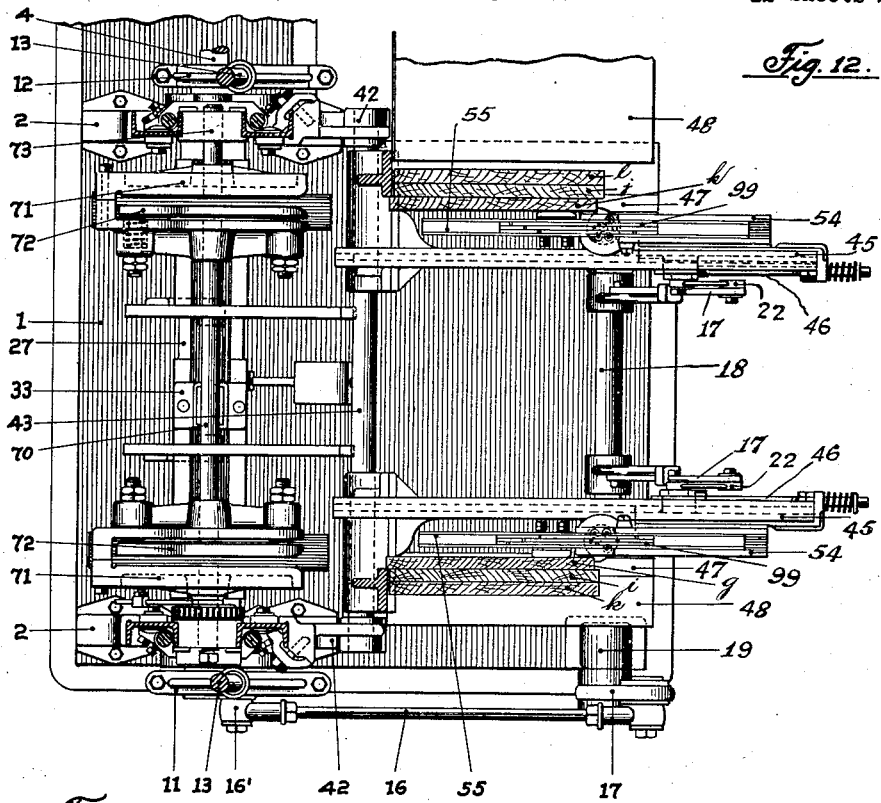
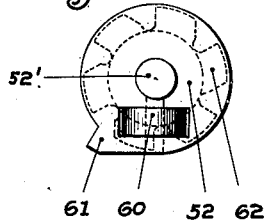
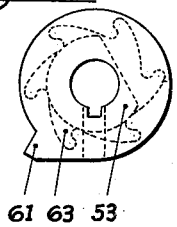
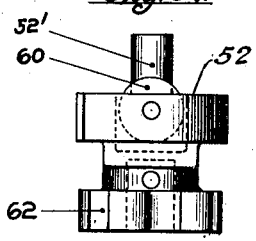
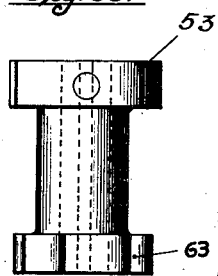
Inventor
By George D. Parker
Acker & Totten
Attys Dec. 13, 1927.  
G. D. PARKER  
1,652,373  
AUTOMATIC BOX MAKING MACHINE  
Filed Sept. 25, 1923  12 Sheets-Sheet 7
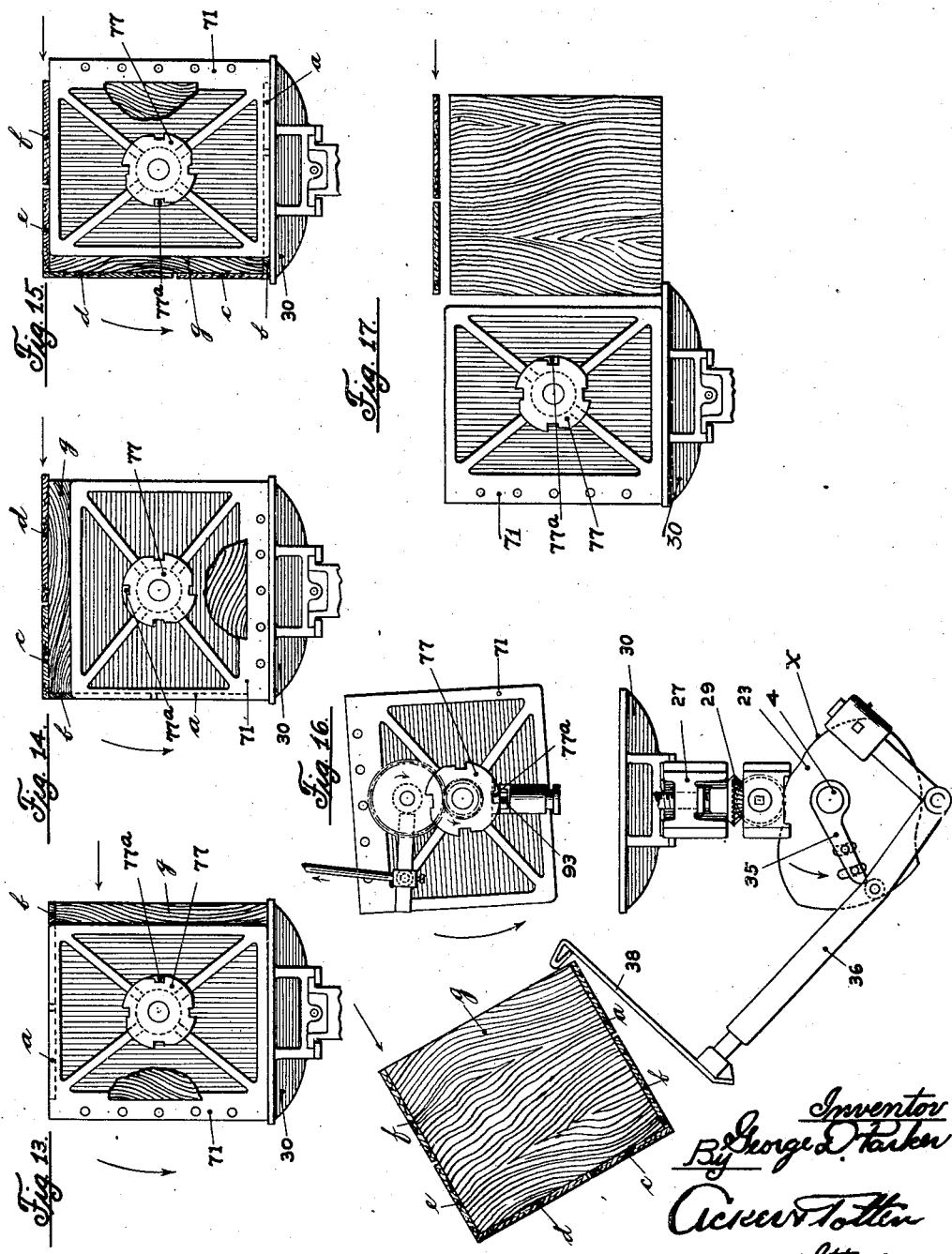

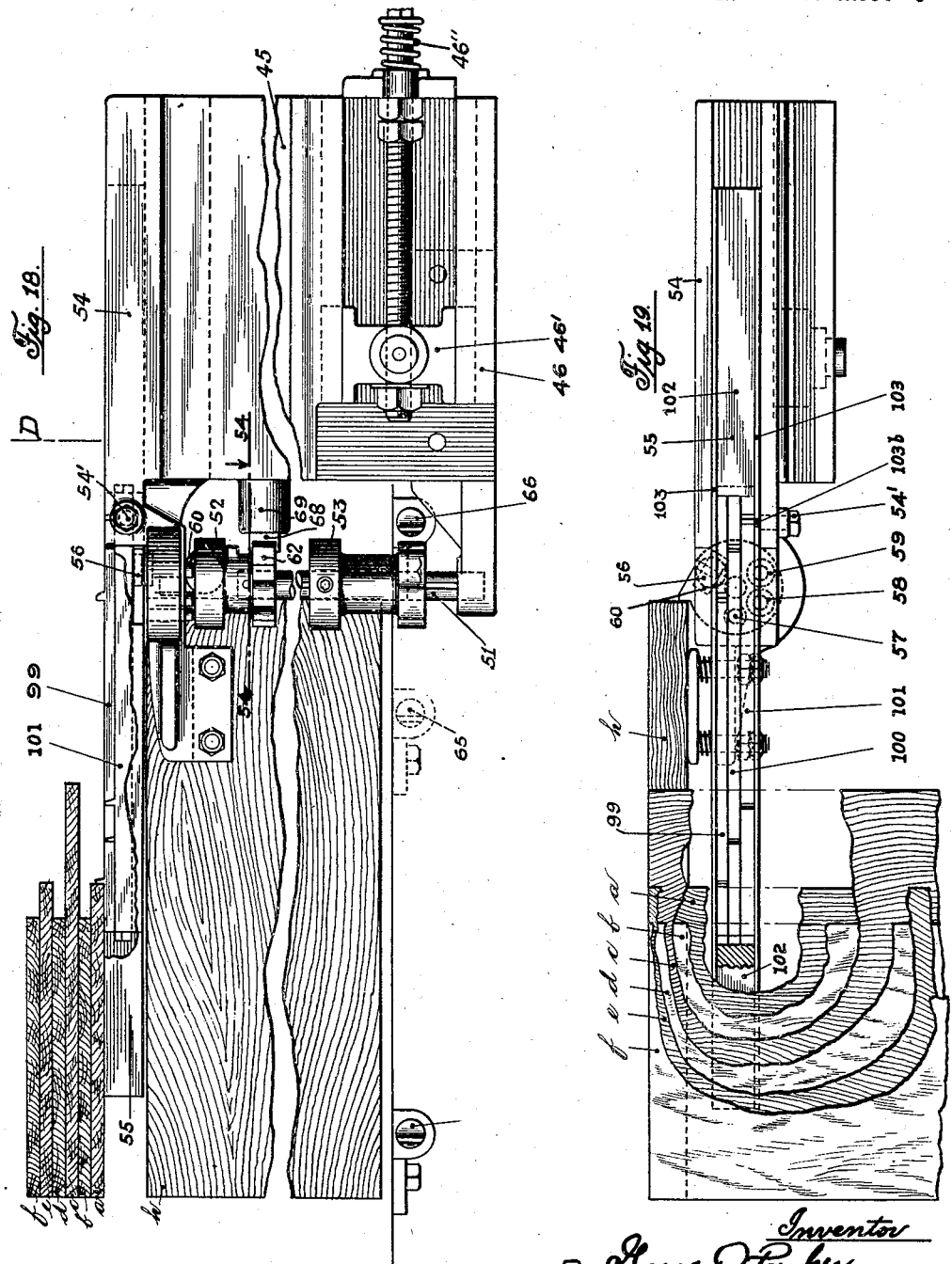

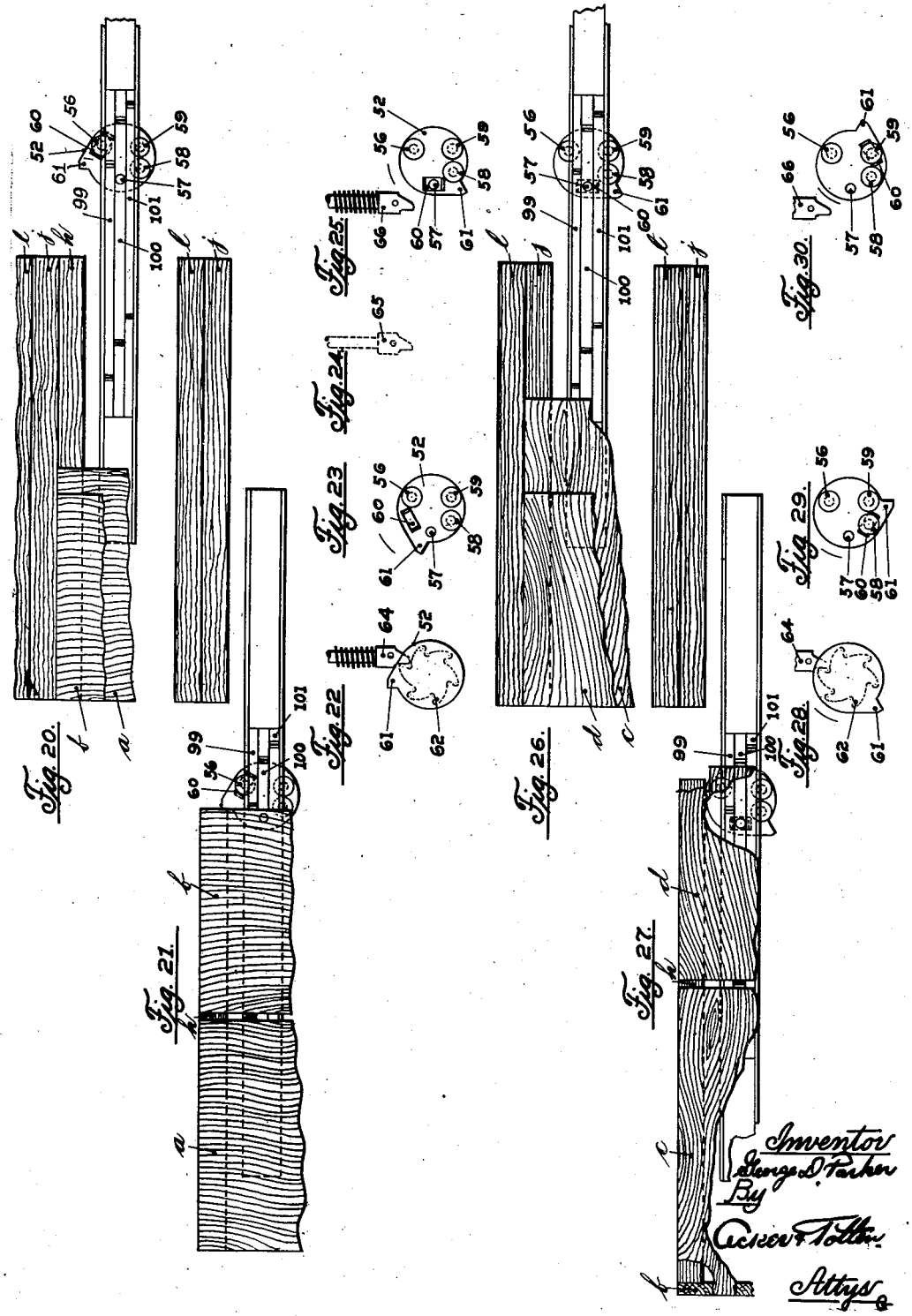

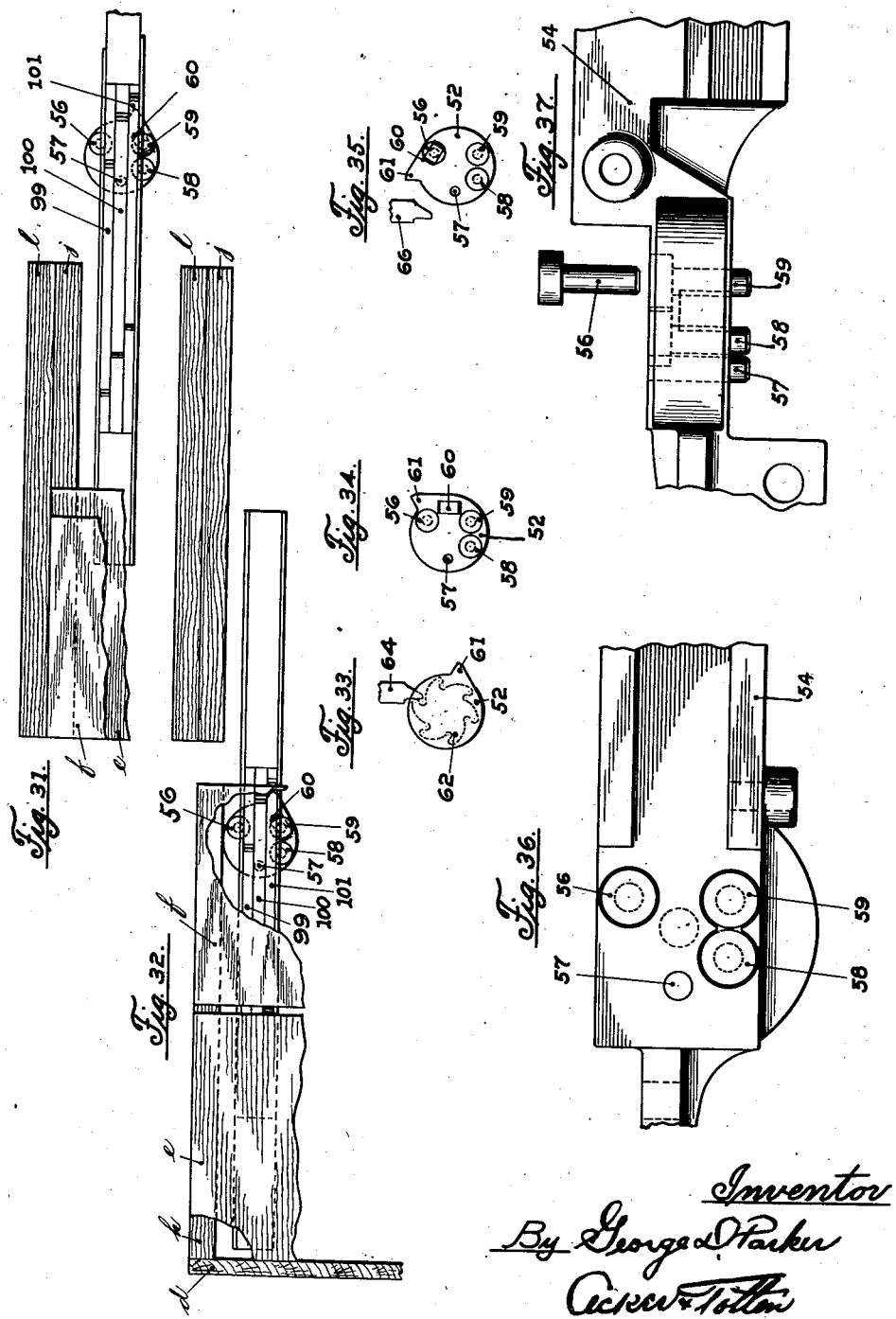

Dec. 13, 1927.
G. D. PARKER
AUTOMATIC BOX MAKING MACHINE
Filed Sept. 25, 1923
1,652,373
12 Sheets-Sheet 11
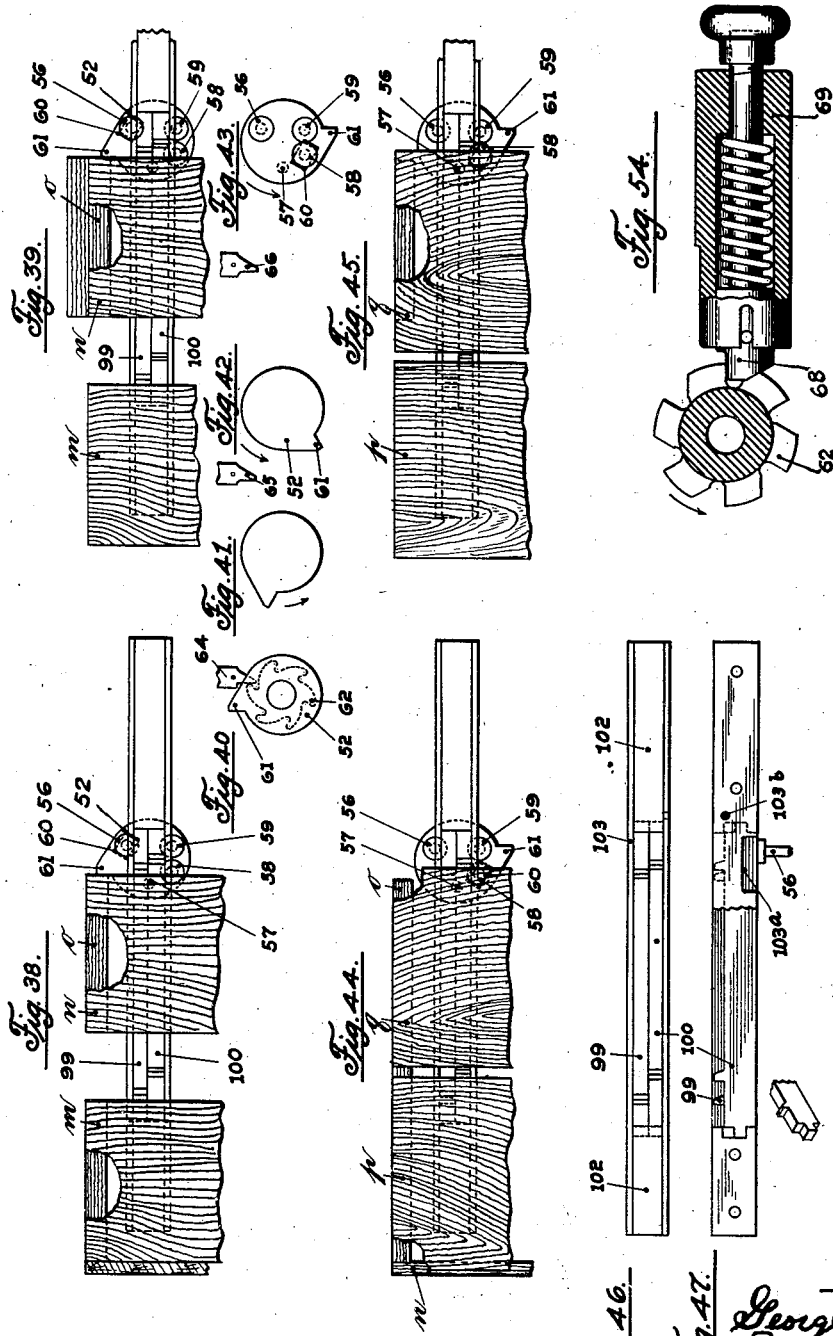

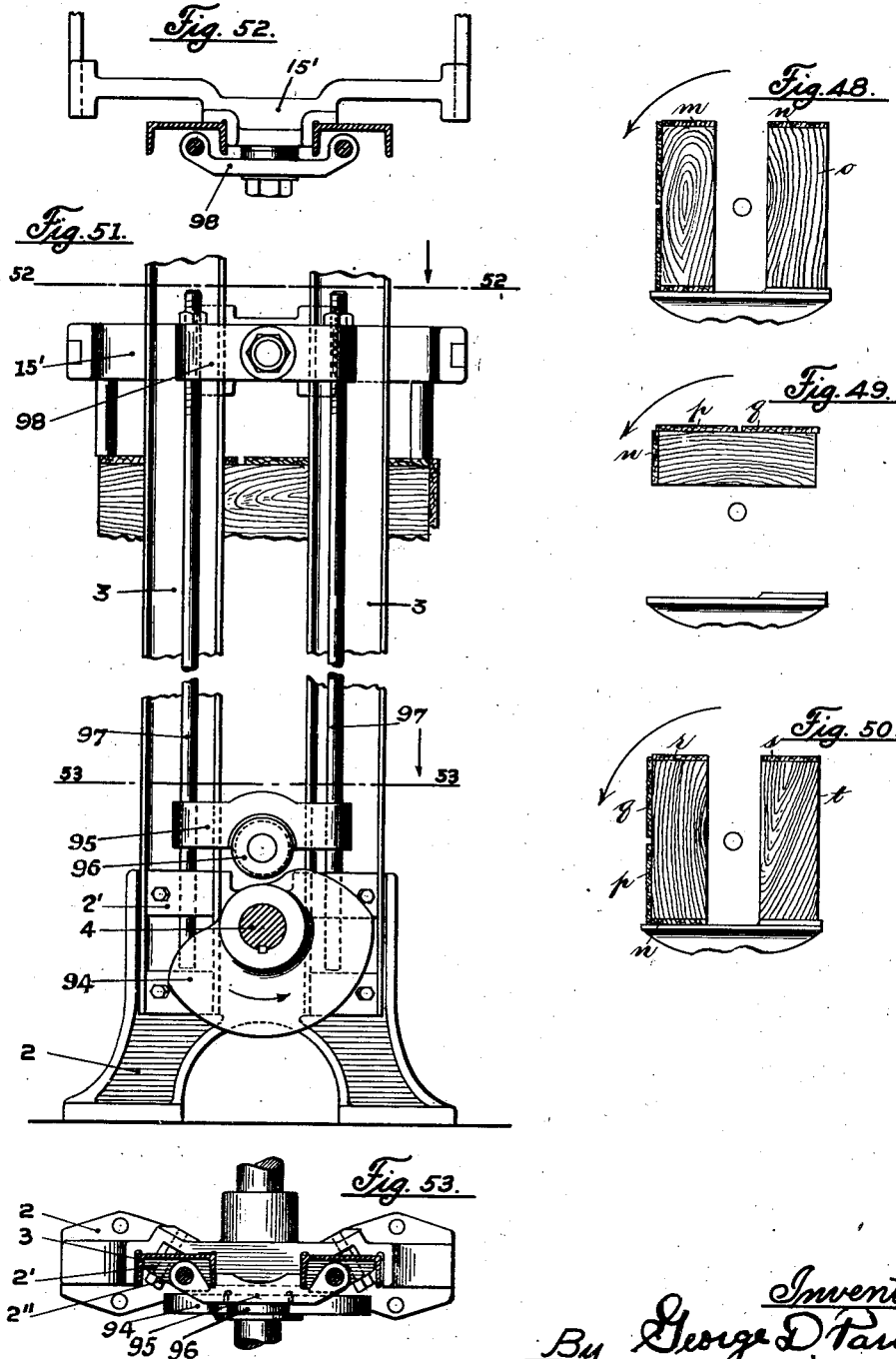

Patented Dec. 13, 1927.

1,652,373

UNITED STATES PATENT OFFICE.

GEORGE D. PARKER, OF RIVERSIDE, CALIFORNIA.

AUTOMATIC BOX-MAKING MACHINE.

Application filed September 25, 1923. Serial No. 664,685.

This invention relates to an automatic machine for assembling and nailing wood boxes from previously prepared box shooks.

A principal object of the invention resides in providing a full automatic machine adapted to successively feed box parts from storage magazines to suitable holding and aligning forms, where the ends, sides and bottoms are nailed together to form boxes of commercial sizes and shapes; to be highly efficient in operation and capable of continuously producing large quantities of boxes of a given size and shape in the minimum of time and with the minimum of labor.

Another object of the invention resides in providing a full automatic box making machine that is adapted to operate on a single box during each cycle of operation where the depth of the box is greater than half the width, and to operate on two boxes during each alternate cycle of operation where the depth of the box is less than half the width.

Another object of the invention resides in providing a plurality of interchangeable box parts holding forms and feeding means for box parts, whereby the machine may be readily adjusted to make boxes of differing sizes and shapes, the various holding forms and feeding means being adapted to placement and adjustment within the machine in the minimum of time so that continued operation is not materially interfered with.

Another object of the invention resides in providing a machine for making a comparatively large box, wherein it is necessary to make the sides and bottoms of a plurality of pieces, and the providing of feeding means for feeding and aligning a plurality of box sides or bottoms in relation to each other during one half of each cycle of operation of said machine.

A still further object of the invention resides in a specially designed indexing and positioning mechanism that automatically controls the movement and positioning of the box parts holding forms when changing from a position of completed operation to a position of commencing operation, which change takes place during the idle half of each cycle of operation.

Other objects of the invention resides in the special means and mechanism for accurately effecting the changes and adjustments referred to with rapidity and certainty.

With such objects in view as well as other advantages which may be incident to the use of the improvements, the invention consists in the procedure, and in the parts and combinations thereof hereinafter set forth and claimed, with the understanding that the several necessary elements constituting the same may be varied in proportion and arrangement without departing from the spirit of the invention.

In order to make the invention more clearly understood there are shown in the accompanying drawings means for carrying the same into practical effect, without limiting the improvements in their useful applications, to the particular construction which, for the purpose of explanation, have been made the subject of illustration.

In connection with the drawings forming a part of this specification I wish to point out that the general arrangement of the related parts, their placement and operative timing have all been so shown and displayed that the operation of the invention would be most clearly understood, the drawings, therefore, are to be looked upon as somewhat diagrammatic in their disclosures. Further reference will be made to this feature of the illustrations as the description proceeds.

I have also omitted from the drawings and description all reference to the nail supplying hoppers as this may be of any form well known in the art.

I have also omitted a specific description of the power control means but have shown a part of this apparatus in connection with the present drawings to illustrate the relation of the same thereto.

Mechanism embodying the preferred structural peculiarities of the different parts, the preferred disposition of the different parts, the combinations forming the subject matter of my improved machine are illustrated in the accompanying drawings, in which—

Figure 1 is a front elevation of my improved automatic box making machine showing the various parts and combinations in the positions that will best illustrate their locations and connections. The box making elements proper that are normally located directly back of the parts shown in this view are omitted entirely. This view illustrates only the front view of the feed devices, the box end hoppers and the magazine for carrying the supply of box sides and bottoms and the mechanism of the machine that can be best illustrated in this view. The positions of the various parts as to the accurate timing of the machine are only approximately correct although they are shown in their proper locations in relation to each other.

Figure 2 is a sectional side elevation taken approximately on line 2—2 of Figure 1 looking in the direction of the arrow at the top of Figure 1. This view includes all of the parts in side elevation, that are shown in Figure 1 with the addition of the parts of the machine that were omitted in Figure 1. There is included in this view, however, a part of the feed operating mechanism that would normally be omitted as being in front of the line of section, this part constitutes the operating levers and part of the connecting rod for giving reciprocation to the box parts feed mechanism.

The actual mechanism for handling, holding and operating on the boxes during their formation, are in this view shown in approximately a finished operation. The box forms that hold the box parts is in the position where the last sides have just been nailed onto the box. The nailing frame and nail chucks are just about to be raised, the finished box just about to be ejected from the forms and the forms to be rotated through an arc of 180 degrees which will place them in the position to receive the first parts of the next box and the beginning of a new cycle of operation. The mechanism of this view is in approximately the proper timed relation.

Figure 3 is a rear elevation of the machine looking in the direction of the arrow A of Figure 2 and shows all of the parts appearing on this side of the machine but omits all of the parts appearing back of these parts, being the feed mechanism, feed chutes and magazines as illustrated in Figure 1, this permits the parts occupying positions on this side of the machine to be viewed and understood without distracting mechanism occupying the attention. The parts and mechanisms of this view are in approximately the same operative positions as they are shown in Figure 2, in this view of course the entire back of the machine is shown instead of only the sectional part of Figure 2. This view is the first to show any part of the indexing and controlling mechanism for rotating the box forms to permit the ensuing operation on a partially formed box and for giving a rotation through 180 degrees to place the forms in position for commencing a new operation.

Figure 4 is a side elevation of the main part of the machine omitting the feed devices entirely and is looking in the direction of the arrow B of Figure 3, with the various parts and mechanism in approximately the same relative positions of Figures 2 and 3. This view and Figure 5 ensuing are intended to clearly show the means by which the box forms are given their intermittent rotation to present the several sides of the boxes to the operating mechanisms, and the connecting rod operating the nailing frame on this side of the machine has been broken away to better show these parts.

Continued movement of the operating mechanism as shown in this view will first raise the nailing frame and nailing chucks from contact with the finished box, at the same instant the nailing anvils will begin to move away from the box forms and permit them to begin their rotation through the action of the indexing and controlling mechanism, the rotation in this instance will be through an arc of 180 degrees. Just as the nailing frame, nailing chucks and the anvils release the box forms the ejector members, as most clearly shown in Figure 2, will quickly eject the finished box from the forms and as they complete their rotation they will be placed in position to receive new box parts and for the beginning of a new operation.

Figure 5 is a companion view with Figure 4 and shows the box forms as having finished their rotation through the 180 degree arc and are locked by the indexing mechanism against further movement rotatively until the next operative cycle. During the operation of rotating and repositioning the box forms they are given both rotative and reciprocative movement. They are normally held in operative position through the support given by the nailing anvils and will be moved to the operative position as the anvils move upward into the position of Figure 4, at which time they lift the box forms and support them in the position of Figure 4.

Figure 6 is an enlarged detail view of a part of the side of the machine and embraces only that part adjacent the indexing mechanism that lies directly in line with the arrow B of Figure 3. This enlarged detail is partly in section and with other parts broken away to more clearly show the attending mechanism. In this view the indexing mechanism is in the same relative position as is shown in Figure 4 but shows much more clearly the operative lever connecting with the driving frame, the gearing and the notched index disk and the locking mechanism for holding the indexed parts in position until their control is transferred to the nailing anvils.

Figure 7 is a vertical sectional elevation taken on approximately the line 7—7 of Figure 6 looking in direction of the arrow and illustrates in further detail the general assemblage and relative positions of the operative elements of the indexing mechanism.

Figure 8 is a sectional plan of the index locking dog and attending mechanism taken on approximately line 8—8 of Figure 6 looking in the direction of the arrow. The dotted rectangle in this plan indicates the position of the notched index disk in relation to the locking dog.

Figure 9 is a side elevation of the notched index disk while in its lowermost position and while passing through its 180 degree of rotation. This view shows the locking dog fully depressed and the closed notch of the indexing disk just about to pass by the dog. The closing of this notch permits of the 180 degree of rotation when repositioning the box forms for the beginning of an operation on a new box.

Figure 10 is a similar view and shows the index disk as having completed its 180 degree rotation and as being held in locked position by means of the locking dog resting in the notch on the lower edge of the disk. It is here shown in the same position as it is shown in Figure 5.

Figure 11 is a detail illustrating the friction gear control device and is a view looking in the direction of the arrow C of Figure 7. Parts of the gears and friction members are broken away to more clearly illustrate their relative positions and operations.

Figure 2:
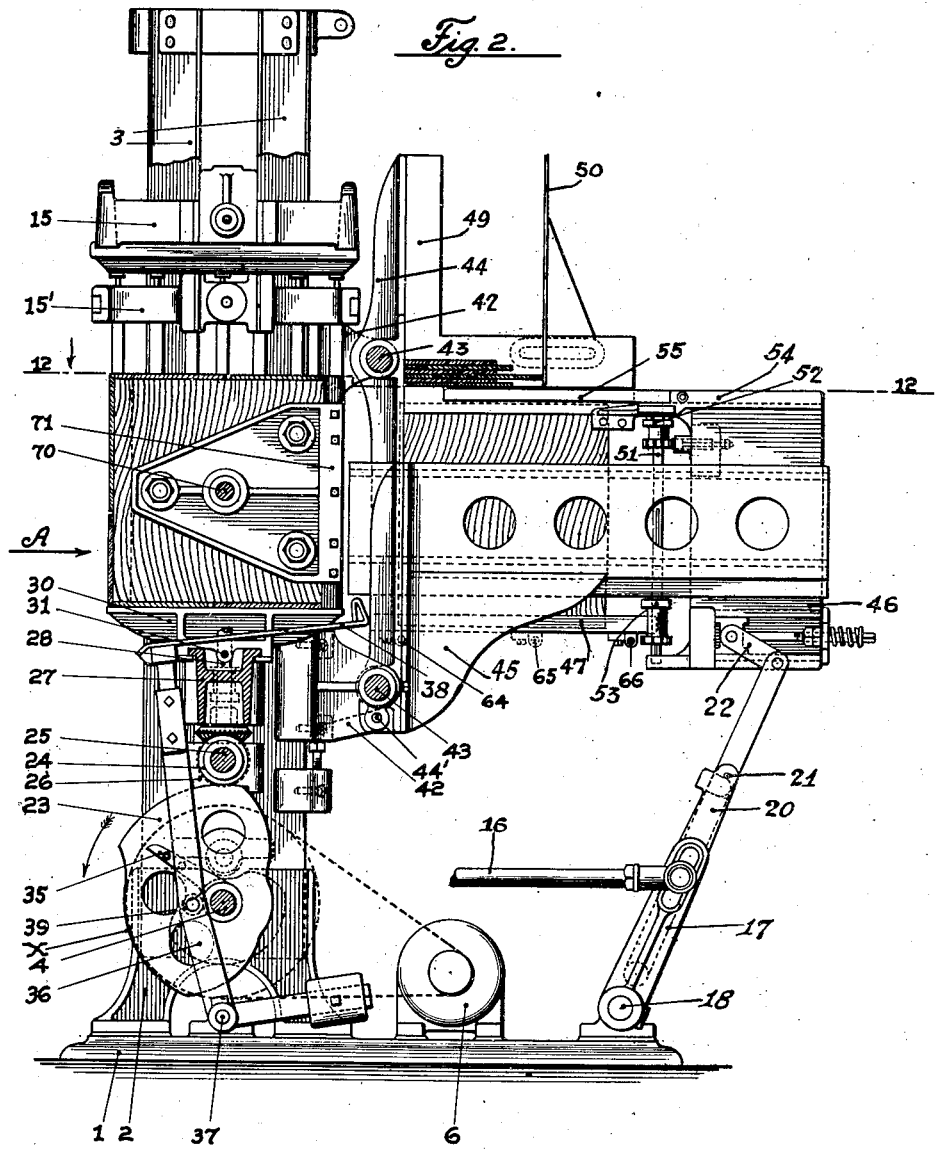
Figure 5:
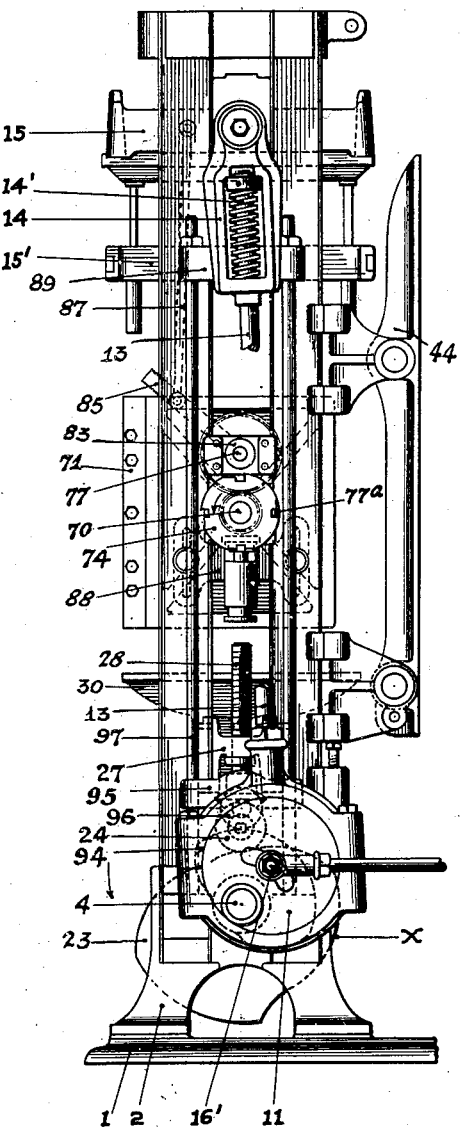

Figure 12 is a sectional plan of the machine taken on approximately the line 12—12 of Figure 2 but with the various parts and mechanism somewhat in advance of Figure 5. The sides and bottom chutes have been omitted in this view in order to more clearly show the operating mechanism, the parts being set in the position of commencing operation. The feed devices have moved forward and are just about to carry a pair of box ends or heads and the parts for one side, into the box forms. The head chutes are only partly shown and contain three heads on each side. The box forms are shown in plan and clearly illustrate their manner of construction when taken in connection with what is shown in Figure 2, although in the position of Figure 12 they are shown as having advanced 180 degrees from the position of Figure 2.

Figures 13 to 17 inclusive illustrate the several stages and steps in the operation of forming a complete box and ejecting it from the machine and will be referred to in detail in the further description of the operation of the machine.

Figure 18 is a side elevation of the box parts feed mechanism looking in the same direction as in Figure 2 but with some of the supporting frame work omitted to more clearly illustrate the feed action and the relative relation of the various parts. In this view the feed parts have advanced in their forward stroke to the point of just engaging the box heads or ends and the first board or slat of the first side to be advanced to the box parts holding forms. The dotted line D indicates approximately the full back stroke of the feed mechanism.

Figure 19 is a plan of Figure 18 with the various parts in approximately the same relative positions, but with the side and bottom boards superposed in their normal positions as when resting in the magazine, broken away to better show their relative positions.

Figures 20 to 35 inclusive show the various stages of operation and positions of the box parts feeding mechanism and the parts being fed and illustrates clearly just how it is possible to feed box ends or heads only every third stroke of the feed mechanism and to feed sides and bottoms at every stroke of the mechanism. The special means of accomplishing this result will be dealt with in detail as the description of the operation of the machine progresses.

Figure 36 is a plan of a part of the feed control mechanism somewhat enlarged to clearly show the parts that operate to control the feeding of the sides and bottoms.

Figure 37 is a companion side elevation of Figure 36 and shows the same parts in the other projection and in the same relative positions, with one of the carrier lifting plungers elevated to show its shape and form.

Figures 38 to 47 inclusive illustrate the steps and stages of feeding operation required when making boxes whose depth is less than half the width and two are handled or operated upon alternately during the continuing cycles of operation. This manner of feeding the box parts will be taken up in further detail as the description of the operations of the machine progresses.

Figures 48, 49 and 50 illustrate the positions of the boxes while carried by the forms when making the boxes referred to regarding the illustrations in Figures 38 to 47 and will be discussed in full detail as the description progresses.

Figure 4:
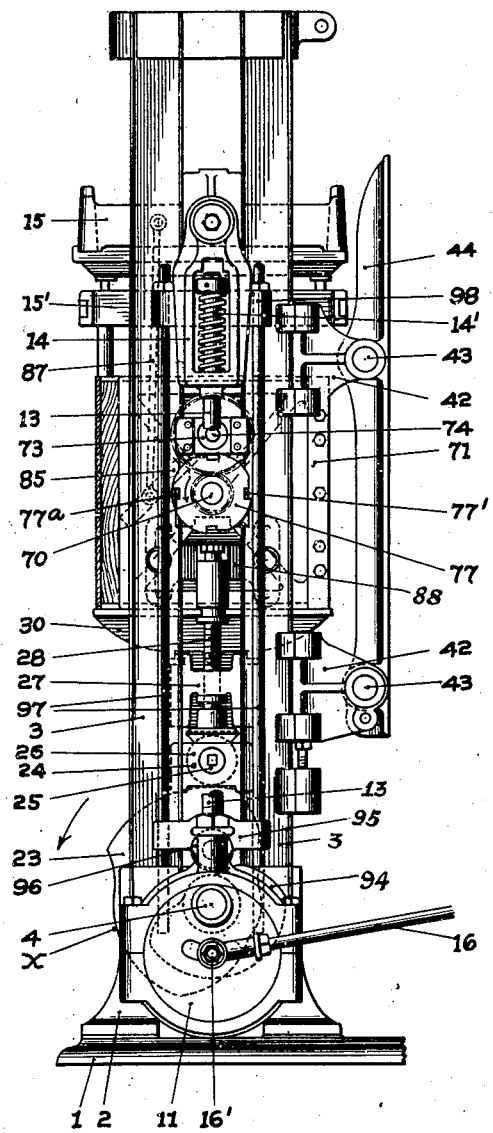

Figure 51 is a side elevation similar to Figure 4 but with the driving eccentric removed and with much of the other mechanism omitted so as to clearly show the means for operating and controlling the timed movements of the driving chucks in relation to the other operating parts of the machine, this mechanism will be fully explained in the further description of the machine.

Figure 52 is a sectional plan taken on approximately line 52—52 of Figure 51 looking in the direction of the arrow.

Figure 53 is a sectional plan taken on approximately the line 53—53 of Figure 51 and looking in the direction of the arrow.

Figure 54 is a sectional plan detail of the locking mechanism operating in connection with the mechanism that feeds the box heads or ends into the holding forms and is taken on approximately the line 54—54 of Figure 18 looking in the direction of the arrow.

Figure 3:
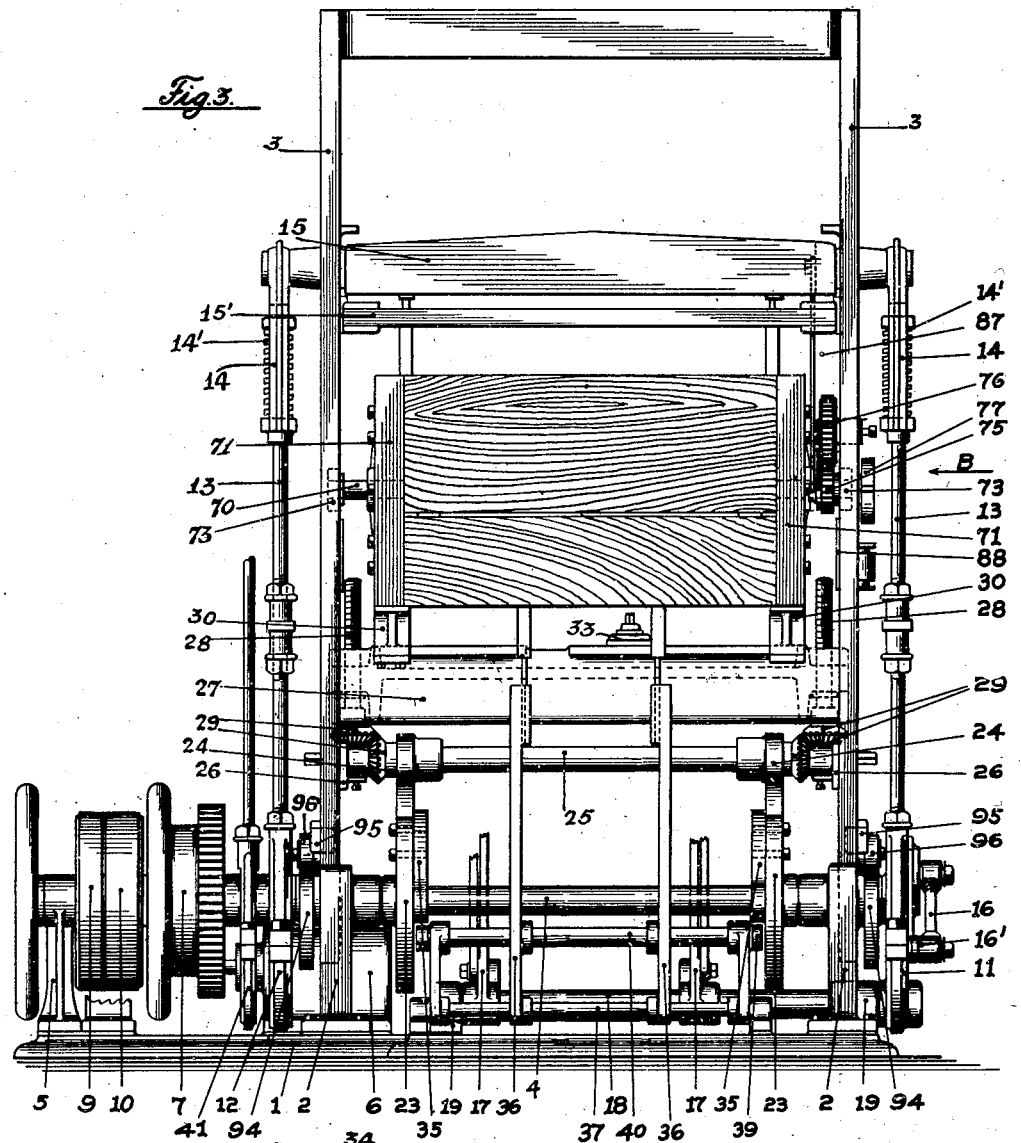

Figure 55 is a sectional elevation of the anvil frame 27 to clearly illustrate the manner of adjusting the anvils laterally to accommodate different size boxes, the view is taken on the same plane as that of the frame in Figure 3.

Figures 56 and 57 are companion views showing the top head feed dog in enlarged projection, showing a plan and side view of same and clearly illustrates the details of structure attending this part.

Figures 58 and 59 are companion views showing the bottom head feed dog in enlarged projection, showing a plan and side view of same and clearly illustrates the details of structure.

The reference letters and numerals herein used indicate, respectively, the same part in the different figures of the drawings. The curved arrows indicate without further description the direction of movements of parts, and where single figures of the drawings are referred to in the descriptive part of the specification such reference is only intended to point out a figure in which the specific parts are well shown, and other figures may show the same parts.

The general idea contemplated in evolving this invention comprises the production of a completely automatic box making machine wherein the general structure would be of a simple design and arrangement and capable of being machined and assembled with the least outlay of material or labor; where the various operating mechanisms would be so placed and positioned as to be most easily accessible for the purpose of original assemblage and for subsequent timing and operation; where a continued operation could be maintained in properly timed successive steps for the production of boxes in large numbers of a given size and shape and where all of the operative elements and parts would be so arranged in their placement and functioning as to come within the knowledge and understanding of unskilled operators. With these views in mind we will now proceed with the general description.

The numeral 1 represents a base member on which is mounted standards 2 located in spaced relation. The frame members, forming the general frame work of the machine and on which are mounted in some manner or other practically all of the operative mechanism, comprise channel section members 3, four of which are provided, two rising from each of the standards 2 and forming spaced supports for the various means and mechanism.

These channel shaped frame members 3 are secured to the standards 2 by means of clamping devices most clearly shown in Figure 53 wherein is illustrated a plan of one of the standards 2. It will here be observed that the channel members 3 rest in machined pockets in the standards 2 and are securely clamped therein by means of the clamp blocks 2' and the angularly placed bolts 2''. This method of attachment makes a very rigid structure and is extremely simple in erection.

Figure 1:
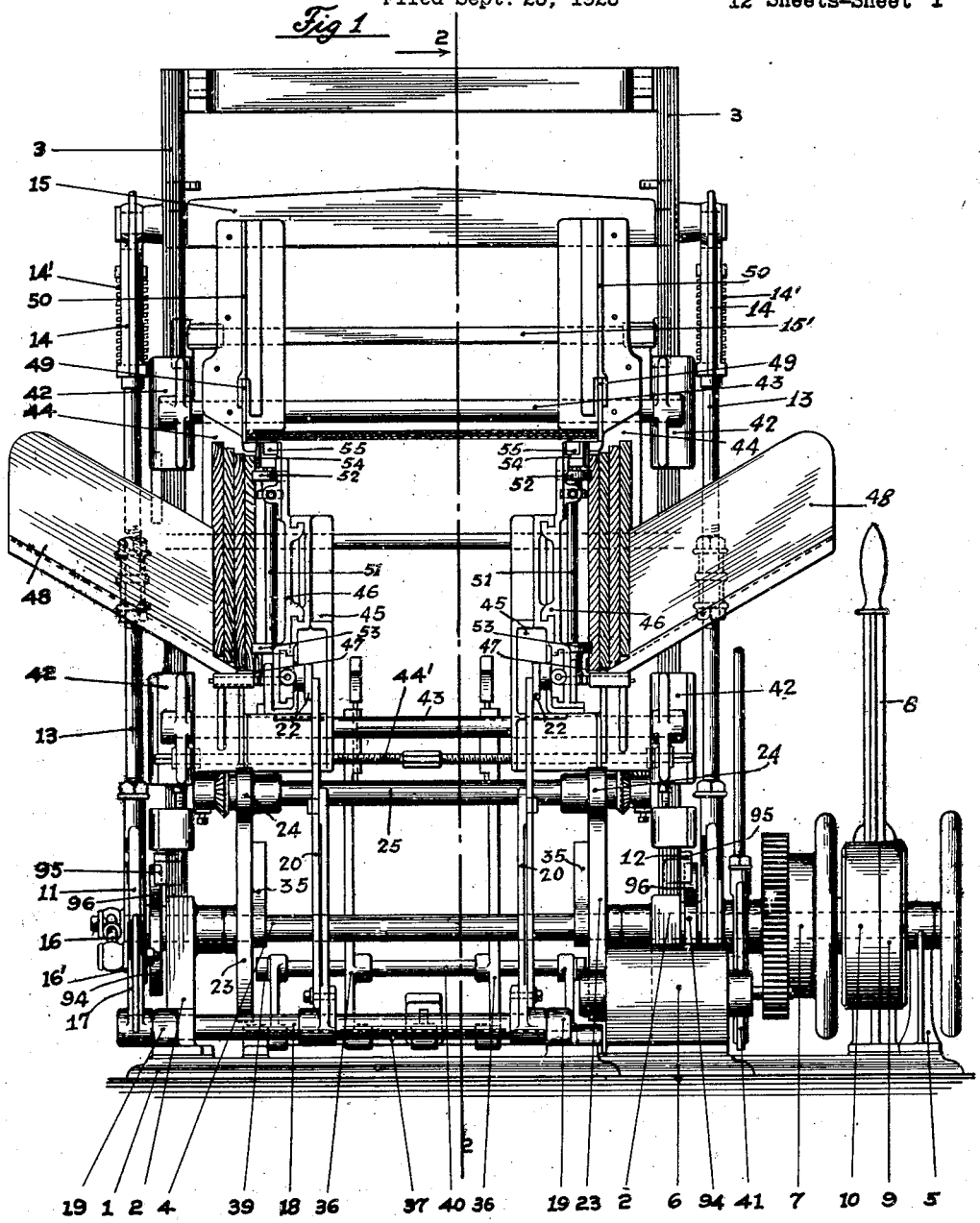

Extending transversely through the lower part of the machine is the main operating shaft 4 suitably supported in bearings integral with the standards 2, with an additional supporting standard 5 located outside of the power transmitting mechanism shown in Figures 1 and 3. The power source comprises a motor 6 connecting with transmission mechanism located on the main shaft 4, the connection as shown being through the medium of a silent chain passing from a pinion on the motor shaft to a larger gear located on the main shaft. The transmission casing 7, Figs. 1 and 3 is not illustrated beyond what is shown in these figures as it and attendant mechanism does not form part of the present invention and may be any desired type of construction known in the art and suitable for the purpose. The machine is controlled through the manipulation of the control lever 8 acting on the brake and clutch drums 9 and 10. Further description of this part of the machine is thought unnecessary.

Located on the extreme end of the shaft 4 at the left of the machine Fig. 1 is a combined eccentric and crank 11, see also Figs. 4 and 5. A companion eccentric is located on the opposite side of the machine, also on shaft 4, and is indicated by the numeral 12, these two eccentrics are set in opposed alignment and carry eccentric connecting rods 13 Figs. 1 and 3. These rods are made up of right and left threaded sections and carry on their upper ends spring cushioning connections 14 which in turn connect with the nail driving frame 15 which is mounted for vertical reciprocation in the frame members 3.

The eccentric 11 also acts as a crank disk for operating the shook feeding devices through suitable connections. These connections comprise the connecting rod 16 pivotally connected with the eccentric 11 as at 16' and extending to the slotted rock lever 17, shown best in Figs. 2, 4 and 5. The lever 17 is mounted on a lateral rock shaft 18, rocking in bearings 19 and in turn carrying the safety rock levers 20. The safety feature of these levers resting in the provision of a shear pin 21, Fig. 2 which has just sufficient shearing resistance to permit of normal operation of the feed devices, if anything happens to interfere with such normal operation that requires more shearing stress than this pin can withstand it will immediately shear and permit the lower part of the lever to oscillate and the feed device to stop wherever the obstruction occurs, this provision is to save serious breakage of expensive parts in the machine and cause an undue loss of time thereby. A new shear pin can be applied in a very few minutes. The upper end of the lever 20 connects with the main feed mechanism through the medium of a short link 22.

There is also mounted on the main shaft 4, anvil lifting cams 23, Figs. 1, 2 and 3 which control and lift the nailing anvils and attendant mechanism through the medium of the cam rollers 24 carried by the transverse shaft 25, mounted in suitable sliding bearings 26, moving vertically between the frame members 3.

The nailing anvil mechanism comprises the anvil carrying frame 27 having vertical sliding movement between the side frame members 3 and having vertical adjustment to accommodate different size boxes through the medium of the adjusting screws 28 and the miter gears 29, manipulated through turning the shaft 25 by means of a wrench acting on the squared ends of the said shaft. The anvil carrying frame 27 has finished ways across its top surface over which the anvils 30 are moved laterally to accommodate any size of box being made. This adjusting mechanism is clearly illustrated in Fig. 55, on the sheet with Fig. 3, and comprises a right and left threaded screw 31, having screw engagement with each of the anvils 30 and being operated by means of the miter gears 32 contained in the housing 33 and manipulated with the squared ended stub shaft 34.

The main shaft 4 also carries a pair of cams 35, that are held in proper operative location by being bolted directly to the sides of the cams 23. The function of the cams 35 is to actuate the ejecting devices 36. These devices comprise levers mounted on the rock shaft 37 carrying yielding ejector members 38 on their upper ends and are rocked in proper timed relation with the movement of the box holding forms to eject a box each time one is finished, by means of the cam 35. Of course the ejectors go through the motion of ejecting a box at each revolution of the machine, but so long as there is no side on the box resting on the anvils 30 there is no part of the box in line with their movement for them to engage. When making a box such as is shown in Fig. 2 their action only becomes effective every third stroke of the machine, but when making boxes such as is illustrated in Figs. 48, 49 and 50 their action becomes effective every second stroke of the machine, because in each of these instances there is a side nailed to the side of the box resting on the anvils, and this side lying within the zone of movement of the ejecting members 38, is engaged by said members and the box is quickly thrust from the machine. This ejection must be rapid as at the point of beginning to eject the box forms are about beginning to rotate and to move downward and the boxes must be gotten out of the forms before they turn too far. The cams 35 actuate the ejecting devices through the rollers 39 on the projecting ends of the aligning bar 40, which bar serves to hold the ejectors 36 and the rollers 39 in proper operative alignment.

Since none of the nail hopper or attendant mechanism has been shown in the mechanism for operating them has also been omitted except the driving eccentric 41 which is shown as mounted on the main driving shaft 4 in Figs. 1 and 3.

The shook feed mechanism and the box forming and holding mechanism is best shown in Fig. 2, that is, their general operative relation is rather better comprehended in this view. See also Figs. 1 and 12 for other projections of these mechanisms.

Mounted midway on the frame members 3 are supporting brackets 42, clamped into position in a similar manner as that described for clamping the frame members 3 to the standards 2, except that in this instance the clamping bolts do not pass through holes in the frame members 3 so that these brackets 42 are capable of vertical adjustment for whatever purpose such adjustment may be needed.

The brackets on opposite sides of the machine are laterally connected by means of the cross bars 43 and are thus tied in position. The cross bars 43 act as carriers for the entire shook feeding mechanism.

The shook feed mechanism is directly supported on vertically disposed brackets 44, to the outer faces of these brackets is secured the shook carriage brackets 45 providing guideways for the shook carrier blocks 46, which are thus permitted to reciprocate through the action of the feed arm 20 and convey shook parts into the forms.

Also mounted on the brackets 44 are the head hopper brackets 47 which carry and support the head hoppers 48.

On the upper parts of the brackets 44 are mounted the bottom and side shook hoppers. These hoppers comprise the angular members 49, having ledges on their bottom edges for supporting the ends of the bottom and side shooks and having adjustable supporting members 50 for retaining the bottom and side shooks in proper place.

The shook feed mechanism proper comprises the shook carrier blocks 46 having mounted on their forward edges the vertical head feed dog shafts 51, reference being now had to Figs. 1, 2, 12, 18 and 19, 18 being rather the best view to show these parts. The shafts 51 in turn carry the head feed dogs 52 and 53. On the top edges of the carrier blocks 46 are mounted the brackets 54 for supporting the side and bottom shook feed dog bars designated generally by the numeral 55. The carrier blocks 46 also act as the top support for the vertical dog shafts 51 and also have an enlarged section at this location for carrying the bottom and side dog lifting plungers 56, 57, 58 and 59. These plungers are actuated to lift the side and bottom shook dogs through the action of a lifting roller 60, best shown in Fig. 18, while Fig. 19 gives a plan of it in operation but in dotted lines. See also Figs. 56 and 57 which show it and the head dog 52 in detached position.

The head feed dogs 52 and 53, Figs. 56 and 57, 58 and 59 are provided with head engaging lugs 61. The dogs 52 are provided with ratchet shaped locking lugs 62, while the dogs 53 are provided with ratchet shaped rotating lugs 63. The function of the lugs 62 and 63 will be explained later.

Located along the path of travel of the carrier blocks 46 and positioned in line with the ratchet lugs 63 of the dogs 53 are arranged a series of spring pressed repositioning plungers 64, 65 and 66. These plungers engage the ratchet lugs 63 of the feed dogs 53 and reposition them as will be explained. These plungers are best shown in Fig. 18. Located opposite the head feed dogs 52 and carried by the carrier block 46, are locking plungers 68, carried by brackets 69. The plungers are spring pressed and serve to lock the backward rotation that may be occasioned by the lugs of the feed dogs 53 dragging over the repositioning plungers 64, 65, and 66 on the forward or feed stroke of the carrier block 46. The ends of the locking plungers are provided with rounded knobs to facilitate the disengagement of the plungers if it becomes desirable.

Referring now particularly to Figs. 2, 3, 4, 5, and 12 I will describe the parts and locations of the box parts holding forms and indexing mechanism for controlling the movements of these parts during the successive cycles of operation.

The laterally disposed shaft 70 carries a pair of box parts holding forms designated as a whole by the numeral 71, this shaft 70 however is not continuous when making the type of box shown in these views but is made up of three separate parts as will be more specifically referred to. The box parts holding forms 71 are made up of form sections bolted together to form open sided U-shaped receptacles in which the box heads or ends are placed by the feed mechanism, and are provided with spring pressed retaining plates 72 which act to hold the heads firmly in place when positioned therein by the feed devices. The inner member of the U shaped holding forms is made as shown in Fig. 2 to provide operating space for the bottom and side feed bars. The outer member of the U shaped receptacle is made of practically the same dimensions as the box being operated upon, so that the shape of this member determines the position of the holding forms while resting on the driving anvils 30. The box parts holding forms 71 are given lateral adjustment for different size boxes through mounting them on different lengths of the shaft 70. These differing shaft lengths are clearly shown in Fig. 12 where it will be seen that the shaft sections do not extend through the U shaped opening where the box heads are supported but are cut flush with the inner faces thereof, therefore, to adjust the separation of the two opposed holding forms it is only necessary to provide shaft portions of the proper length to place the form in proper alignment with the feed line of the heads to form the length of box desired.

The shaft 70 carries sliding block bearings 73 held in proper alignment between the frame members 3. On the index end of the shaft the bearing has an upwardly extending portion that forms a bearing for the short gear shaft 74 that carries the friction controlled indexing gear arrangement.

The indexing mechanism for regulating and controlling the rotary movements of the box forms during the successive cycles of forming a box is best illustrated in Figs. 4 to 11 inclusive, Figs. 4 and 5 showing this mechanism in its two opposite positions while Figs. 9 and 10 show the indexing member in transit and in final indexed and locked position. The position of the box forms in Fig. 4 is that of a completed operation, so that the movement of the indexing mechanism from the position of Fig. 4 to that of Fig. 5 will result in the box being ejected from the forms as is shown in Fig. 16 and the box parts holding forms being positioned through a travel of 180 degrees to the position of a commencing operation as in Fig. 17, where it is more clearly shown than in Fig. 5. This change of position and the manner of producing it will be more fully dealt with in the description of the operation of the machine.

The indexing mechanism comprises the following parts, referring particularly to Figs. 6 and 7. Mounted on the shaft 70 is a pinion 75 meshing with a frictionally controlled free running gear 76, the pinion 75 being secured to the shaft 70 by means of a pin, set screw or key as may be preferred. The pinion 75 and the gear 76 are mounted on the inside of the frame as shown in Fig. 3. Located on the outer end of the shaft 70 is the notched index member 77 through the medium of which the box parts holding forms are accurately located and positioned for the next operation at the end of each cycle. The shaft 74 passes through a sleeve 78, Fig. 7, and carries on one end a nut and on the opposite end the stiff spring 79. The end of the sleeve 78 over which the gear 76 rides freely is squared as is indicated at 80 Fig. 11. The friction disks 81 and 82 have squared holes to fit the end of this sleeve while the gear 76 has a round hole so that it will turn freely around this squared end of the sleeve. Between the disks 81 and 82 are located fiber friction disks 83 and 84 which have round holes and are free to rotate with the gear 76, although they would probably operate as well if mounted with squared holes and thereby made to rotate with the disks 81 and 82. Secured to the outer face of the disk 81 is an operating arm 85 having a sliding pivot block 86 secured in proper position to give the desired extent of throw, by means of a set screw. Extending from this pivot block 86 is a pitman 87 having pivotal connection with the driving frame 15.

The spring 79 must be of sufficient tension to hold the disks 81 and 82 in such resistive contact as will be amply sufficient to cause a positive rotation of the shaft 70 and reposition the box parts holding forms each time the mechanism is operated, the excess movement incident to this operation will be spent in simply moving the friction disks in slipping contact with the gear 76.

Located directly underneath the index disk 77 is located a stop bracket 88 carrying a housing 89 in which housing is located a combined torsion and compression spring 90 and also an indexing plunger 91 having a T head block integral with its upper end resting against a stop plate 92, and, due to the torque action of the spring 90 to said T head is normally held in an angularly inclined position as is indicated at 93 Fig. 8, the back corner of the T being bevelled to permit of this location. The spring 90 is able to exert a torque action to the plunger by having its upper end secured to the under side of the shoulder, the wire end of the spring being bent upward and inserted in a hole in the shoulder, and it also acts as a compression spring by being confined between the shoulder on the plunger and the adjustable sleeve entering the lower end of the housing 89. Further reference to these parts will be made in the description of the operation of the machine.

The mechanism for operating the nail chuck frame in proper timed relation with the other operative parts of the machine will now be described.

Located on the shaft 4 just outside the standards 2 on opposite sides of the machine are lifting cams 94, see particularly Figs. 3 and 51. Located just above this cam is a cam roll cross head 95 carrying the cam rolls 96 and mounted to reciprocate with connecting rods 97, the rods 97 finding bearing in the frame clamping blocks 2'. The rods 97 extend vertically within the channel frame sections 3 and carry on their upper ends the chuck frame cross heads 98 which are pivotally connected to the chuck frame 15'.

In entering upon a discussion of the operation of my improved automatic box making machine, a few preliminary remarks seem to be in order.

I have illustrated the machine as operating upon a box of quite large dimensions and have shown this box as being composed of single board head or end pieces, and double board side and bottom pieces.

The thought in doing this was to illustrate in the clearest possible way the ingenious feed mechanism I have devised for handling multiple box parts in this manner.

The feed mechanism will handle the parts for multiple sides or bottoms or for single sides or bottoms without mechanical alteration or adjustment other than changing the feed dog bars that select the parts from the sides and bottom magazine.

This is a feature of prime importance in the simplicity of operation, and this slight change may be accomplished in much less time than it takes to tell about it.

I have also shown by special diagrammatic views the manner of operating the machine to make smaller boxes where two boxes are in the box parts holding forms at each alternate cycle of operation.

With these thoughts in mind I will now proceed with the operative description.

We will assume that the machine and all of its operative parts are set in proper timed relation and the head chutes and the bottom and side magazine are properly filled with box parts adapted to make a box such as is illustrated in the drawings, referring particularly to what is shown in the main views and in Figs. 13 to 16 inclusive.

By reference first to Fig. 18 it will be observed that I have lettered the bottom and side parts $a$, $b$, $c$, $d$, $e$, and $f$ as indicating the parts needed for one box, they are arranged in the magazine in the proper order to be selected by the feed devices and carried into the box forms and there aligned with the head pieces and secured thereto by nailing. $a$ and $b$ represent the first two sides and will be moved forward with the two head pieces $g$ and $h$ Fig. 12. $c$ and $d$ represent the two bottom pieces which will be carried into nailing position at the beginning of the second cycle of operation, and $e$ and $f$ represent the last side pieces which will be forwarded at the beginning of the third cycle of operation. A cycle of operation in this description referring to a single complete revolution of the machine or a complete movement of the feed mechanism forward and back.

I have shown additional head pieces which I have lettered $i$, $j$, $k$ and $l$. These head boards will not be moved from the head chutes in this description but are shown to illustrate in some of the diagrammatic views the manner in which the head feed dogs are able to move past these boards without engaging them during the second and third cycle of operation.

Assuming that the machine is in the position of Fig. 5 the cam 23 rotating in the direction of the arrow begins to raise the nailing anvils 30 through the medium of the cam rollers 24 and connections and the anvil supporting frame 27 until the anvils engage the underside of the box parts holding forms 71 when they are lifted into nailing position as shown by Figs. 3 and 4 but with the forms 71 in the operative position of Fig. 5.

At the instant the cam 23 begins to raise the anvils 30 the driving eccentrics 11 and 12 are just approaching the top of the stroke, and since they control the movement of the driving frame 15 they are just carrying it over its top movement. The eccentric 11 also acts as driving crank for the shook feed mechanism, it will therefore be noted that the connection 16', which is circumferentially adjustable for accurate timing, has just passed its position of moving the feed mechanism to the limit of its back stroke and has started advancing it on the forward stroke. The line D Fig. 18 indicates an idle space movement of the feed mechanism from the point of its back position to the point of engaging the edge of the head boards on its forward or feeding movement. In the position of Fig. 5 the feed mechanism has just left the D position and advanced slightly on its feed stroke, but can travel some distance before engaging the edge of the head boards $g$ and $h$ as it is shown in Fig. 12.

In the position of Fig. 5 and starting therefrom it will be noted that the nail chuck cam 94 is supporting the nail chuck frame 15' in elevated position, the cam roller 96 riding over the long concentric portion of the cam. The nail chuck frame 15' and the driving frame 15 will be held in elevated positions until the box parts are properly aligned in the box parts holding forms 71.

Just before the anvils 30 reach their uppermost position and the box holding forms resting thereon reach their uppermost position the head boards begin to enter the forms 71 and are fed into the forms during their period of rest while the cam roller 24 is riding over the concentric portion X of the cam 23. This ensures the boards resting firmly and squarely on the top faces of the anvils so they will be properly aligned and positioned for the first operation of nailing on the first sides. This first position of heads and sides is represented in Fig. 13.

Just as the head dogs 52 and 53 engage the box heads $g$ and $h$ as in Figs. 12, 20 and 21, the box side feed dog bars 99 having been brought into operative position by mechanism to be described, engage first, the side board $a$ and advance it along in alignment with the heads, and as its support passes from under the other boards in the magazine, they drop onto the ways and the side board $b$ comes into position to be engaged with the second dog on the bar 99. From now on the two side boards $a$ and $b$ travel together with the feed mechanism and the heads $g$ and $h$ are deposited on the box holding forms 71 as is shown in Fig. 13.

Further rotation of the cam 23 now raises the anvils 30 and box forms 71 together with the box parts just delivered to the forms into the final and nailing position, through the action of the roller 24 passing onto the highest concentric portion of the cam 23, this last lifting movement serving also to raise the side boards $a$ and $b$ up out of engagement with the dogs on the feed bar 99 so that the boards $a$ and $b$ will not be displaced by the dogs on the bar 99 as it returns to its back position.

During the period of the movements just described the shaft 4 having turned through part of a revolution the other various mechanisms controlled by this shaft have been moved partly through their cycles of operation. The nailing frame and the nail chuck frame 15 and 15' have been returned to a position just approaching rest on the box parts now held by the parts holding forms 71, the natural weight of the nail chuck frame 15' being sufficient to hold the side boards $a$ and $b$ in position, its movement and position relative to the cam 94, Fig. 51, is such that when it rests on the boards $a$ and $b$ its entire weight is utilized to hold these boards in proper place on the head boards during the nailing operation. This is accomplished through adjusting its position on the lifting bars 97 so that the roller 96 rides free of the cam 94 during this period.

Just prior to the nailing plungers carried by the nailing frame 15 reaching the box parts, the frame 15' will have assumed the position on the box parts just described and the final down movement of the frame 15 will drive the nails and secure the sides to the heads. As there is more or less variation in the thickness of commercially sawed box parts I have provided compensating mechanism in the operation of the nail driving to care for this condition.

The top pivotal connection of the connecting rods 13 constitutes a cushioned connection. The upper end of the rod 13 is threaded and carries an adjusting collar, which in turn controls the tension of the cushioning spring 14', which spring has sufficient tension to drive the nails without unduly forcing the nail driving plungers into the top surfaces of the thicker boards.

Having driven the nails into the first sides and heads the mechanism of the machine proper is in the positions of Fig. 4, except that the box parts holding forms are still in the rotary position of Fig. 5. We are now ready to return the machine parts to the position of Fig. 5, the feed mechanism is returning to its back position to the line D and the nailing frame and chuck frame are moving upward toward their top positions.

As soon as the nailing frame 15 begins its upward movement the repositioning of the box parts holding forms begins to take effect. This constitutes rotating the forms through a rotary path of 90 degrees to place them with the first applied box parts in the position of Fig. 14. This view shows in addition the bottom parts c and d in position, these parts are not yet in position and will not be until the end of the second cycle of operation.

Now is when the indexing mechanism for repositioning the box parts holding forms comes into play. This is best illustrated in Figs. 4 to 11 inclusive. Fig. 4 shows the parts as just about to begin indexing movement while Fig. 5 shows the operation completed, Fig. 9 shows it in transit and Fig. 10 in completed position.

Mounted on the shaft 70 is a pinion gear 75 meshing with the frictionally controlled driving gear 76, the pinion gear 75 and the friction gear 76 are mounted on the inside of the frame members 3. On the outer end of the shaft 70 is a notched index member 77 secured thereto, having notches 77' around its periphery and aligned with the side positions of the box parts holding forms. The gear 76 is mounted to rotate between the two friction disks 81 and 82, said disks being held in operative contact with the gear 76 by means of the compression spring 79 mounted in the sleeve 78. The pinion gear 75 and the friction gear 76 are held in operative mesh through having the gear 76 mounted on the integral bearing block 73 which is slidably contained between the frame members 3.

Fiber disks 83 and 84 are interposed between the faces of the gear 76 and the friction disks 81 and 82 to act as actual contact elements.

Secured to the outer face of the friction disk 81 is an operating arm 85, adjustably secured to this arm is a slidable block 86 having pivotal connection with a vertically disposed connecting rod 87, said rod 87 extending upward and having pivotal connection with the driving frame 15.

Located directly beneath the notched index disk 77 is a T head index plunger 93 normally held in the position as shown in Fig. 8. This plunger has vertical and rotary movement in its housing 89 forming an integral part with the bracket 88. The combined compression and torsion spring 90 acts to normally hold the plunger elevated against the stop plate 92 and in the angular position of Fig. 8, by having its upper end bent axially and secured in a hole in the shoulder of the plunger, thus enabling it to exert a torque action on the plunger and hold it in the angular position. The bracket 88 is adjustably secured to the inner faces of the frame members 3 and aside from carrying the housing 89 its top surface forms a resting place for the bearing block 73 when the parts are lowered thereon by the downward movement of the nailing anvils 30. The function of the T head plunger will be explained further on.

The sleeve 78 carrying the friction gear 76 and the friction disks 81 and 82 is squared on the end where these parts are mounted. This is best shown in Fig. 11. The disks 81 and 82 have squared holes to fit the end of this sleeve, so that the sleeve is compelled to rotate with the disks, while the gear 76 and the fiber disks 83 and 84 have round holes and are free to rotate around the squared end of the sleeve. The spring 79 must be tensioned by means of the nut on the end of the spindle 74 to exert sufficient friction between the gear 76 and the disks 81 and 82 to operate the complete indexing mechanism and turn the box forms when this operation is taking place. Any excess movement of the various parts before and after the actual indexing has been accomplished being absorbed by the slippage of the frictional parts just described.

It will be observed that the only and the entire vertical supports for the box parts holding forms and the indexing mechanism during the nailing period are the nailing anvils and attendant mechanism, they are being so held in Fig. 4. As soon therefore as the cams 23 turn from the position of Figs. 4 and 2, the rollers 24 will begin their descent down the approaching incline and the anvils and all of the parts supported by these cams will move down vertically, and until the bearing blocks 73 find resting position on the top face of the fixed blocks 88, all of the indexing mechanism connected with the shaft 70, and the box parts holding form carried by the shaft 70 will move down with the anvils 30. As soon as the bearing blocks 73 rest on the brackets 88 the anvils will move away from the box parts holding forms, when they will immediately begin to rotate through the action of the friction indexing devices. Coincident with the beginning of the downward movement of the anvils as just described the upward movement of the driving frame 15 begins, and since the indexing friction devices are moving down with the anvils at the same time quite a rapid movement is temporarily imparted to the friction disks 81 and 82, but since the box forms are still resting on the anvils they cannot begin their revolution to a new position, so that the movement of the disks 81 and 82 will produce a slippage between the said disks and the gear 76, as soon, however, as the indexing mechanism reaches the end of its downward movement by coming to rest on the brackets 88, the anvils still moving downward will release the box forms and they immediately begin their rotation through an arcuate path of 90 degrees to the next operative position, the last part of the vertical movement of the frame 15 being sufficient to effect this change in the position of the box forms owing to the geared relation of the pinion 75 and the gear 76.

The accurate and positive indexing of the box parts holding forms takes place through the action now to be described.

The reason for setting the T head of the indexing plunger at an angle will now become apparent. It will be observed that the box forms are in indexed position in Fig. 4 and are in exactly the same position as they are first lowered to the position of Fig. 5, unless, therefore, the T head of the plunger was not placed out of entering alignment with the notch on the underside of the disk 77, the disk 77 would simply be locked in position when it rested and no changing of position would take place in the box forms, since, however, the T head is set out of entering alignment with the under notch of the disk 77, as soon as the anvils release the box forms, the friction devices being in active motion during this period and the point 77″ of the disk 77 is resting on the top of the T head of the indexing plunger 91, the disk 77 will immediately begin to rotate, as well as the shaft 70 and box forms 71, and will continue to rotate until the edges of the next notch engages the sides of the T head and moves it into alignment when it will instantly, through the action of the compression spring 90, snap into said notch and securely lock the disk and box forms from further rotative movement during this cycle. It will be understood that the plunger is depressed as is shown in Fig. 9 while the disk 77 is under rotation and will assume the locking position of Fig. 10 when the indexing action is completed. As soon as the disk 77 begins to rotate the peripheral edge slides over the top face of the depressed plunger 91 and since the spring 90 is adjusted and positioned to give a torsional resistance to the plunger 91 as well as a compressive resistance the head of the plunger may remain in its angular position so that some means must be provided to ensure its being brought into proper alignment with a notch when one is in position. This is accomplished through cutting away a portion of the peripheral edge of the disk 77 on the approaching side of each notch as is indicated at 77′″, Fig. 9. By thus cutting away a portion of the edge of the disk the plunger leg is permitted to rise slightly when this flat portion comes in line with the head and thus ensures the point 77″ of the approaching notch to surely engage the edge of the leg of the T head and swing it into entering alignment with the notch when it will immediately snap into locking position and hold the indexing mechanism from further rotative movement. Figs. 5 and 10 show it in this position. From now on until the anvils 30 again take control of the box forms the indexing mechanism forms a positive locking mechanism and holds the indexed parts in their new positions for the beginning of another cycle of operation. As soon as the anvils have returned and again assume control of the box forms and lift them into nailing position the disk 77 is moved away from locking engagement with the T head plunger 91 and the action of the torsional spring immediately sets the T head of the plunger in the angular position ready for the next indexing and locking operation.

Having now completed the feeding of two heads and the two boards for the first side of the box and nailed them into position and indexed the box forms for the next cycle of operation I will now proceed to describe the manner of manipulating the feeding mechanism to feed only the two bottom boards on the next forward stroke of the feeding devices.

I will first describe in more detail than has been done heretofore, the head feed dog assembly, referring particularly to Figs. 18, 19, 54 and 56 to 59 inclusive.

The vertical shaft 51 is mounted for rotation in a forward position ahead of the feed slide block 46 and carries the upper and lower feed dogs 52 and 53, Figs. 56 and 57 illustrate the upper feed dog most clearly. This dog 52 has a circular head with a feeding lug 61, a pivot extension 52′, a side dog bar lifting roller 60 and a locking ratchet head 62. Fig. 54 shows the manner of locking the feed dogs and shaft against retrograde movement on the forward stroke of the feed mechanism. The bevelled end plunger 68 permits rotative movement of the dogs 52 in one direction only, the reason for this will become manifest as the description proceeds.

The lower head feed dog 53 is best illustrated in Figs. 58 and 59. The feed elements of this dog are identical with that of 52 but the ratchet portion 63 is of a different shape and is adapted to be operated rotatively by means of contacting with the repositioning plungers 64, 65 and 66, best shown in Fig. 18 and the results of this action diagrammatically illustrated in Figs. 22 to 25 inclusive, the reason for which will be described as we progress. Instead of the pivot extension 52' of the dog 52 the dog 53 has a through hole and a key way and is therefore vertically adjustable to suit differing box sizes.

Referring now to Figs. 20 to 25 inclusive the operation or rather manipulation of the head feed mechanism to bring about the condition whereby heads are fed only every third stroke will be explained.

These figures are purely diagrammatic and only contain sufficient of the mechanism to make the operations clear. Fig. 20 may represent the position of the feed mechanism at the point of just beginning its forward stroke. There is shown here only the top of the feed dog 52 and the box side feed bars together with the box heads $h, j$ and $l$ and the first box sides $a$ and $b$. These are the parts that I have already fed into the machine, but this view shows them in plan and makes their positions a little clearer. Fig. 21 shows them as having reached the end of their movement with the head $h$ and the sides $a$ and $b$ in aligned position for nailing. The feed mechanism leaves them in this position and starts on its return stroke. Here is where the manipulation takes place that positions the feed dogs 52 and 53 so that the next forward stroke will feed the bottoms and not feed any heads. The repositioning plungers 64, 65 and 66 are mounted in suitable bearings secured to the bottom face of the box heads chutes and are adjustable laterally so they may be positioned wherever it is desired. The bevelled points of these plungers lie in the path of the ratchets 62 on the lower ends of the feed dogs 53 and each plunger engages a tooth of the ratchet as it passes and turns the dogs and the supporting shaft through an arcuate path of 60 degrees. Fig. 22 shows the first engagement of the ratchet 62 after leaving the box parts as in Fig. 21. As the dogs pass this first plunger 64 they are given a rotary movement of 60 degrees and assume the position of Fig. 23. For the making of a box as I am showing in this operation, the repositioning plunger 65 is not used but I have shown it in position as it will be referred to when dealing with another type of box. The dotted lines indicate that it is not active in this operation. From the position of Fig. 23 the feed dogs continue their backward movement and the ratchets encounter the repositioning plunger 66 when the dogs and shaft are given a further turn of 60 degrees in the same direction as before and left in the position of Fig. 25. It will be noted that they have now moved rotatively through a path of 120 degrees which is just one third of a revolution, during their back travel from the forward feed position to the back feed position.

This seems the proper place to explain the manner of repositioning the side feed bar dogs which will be done, referring first to Figs. 36 and 37 wherein is shown enlarged details of the positioning devices for manipulating these feed bars.

The brackets 54 have what might be called a head portion in the center of which the pivot extension 52' of the feed dogs 52 and 53 finds bearing. Located concentrically around this central point are arranged lifting plungers 56 to 59 inclusive.

Plungers 56, 57 and 59 are spaced 120 degrees around a concentric path to coincide with the repositioning locations of the feed dogs 52 and 53 and are so located around this path as to come directly over the repositioning or lifting roller 60 of the feed dogs 52 and 53, so that on each one of the 120 degree positions of the feed dogs 52 and 53 the roller 60 will rest under one of the plungers 56, 57 or 59 and when so resting that particular plunger will be elevated and the box side feed bar or the bottom feed bar will be elevated into feeding positions in the manner that the side feed bar 99 is shown in Fig. 18.

Fig. 20 shows the roller 60 as resting under the lifting plunger 56 which has raised the side feed bar 99 into feeding position. After having repositioned the feed dogs 52 and 53 as is shown in Fig. 25, where we last left them it will be noted that the roller 60 is resting under the lifting plunger 57, so that in Fig. 26 the center or bottom feed bar 100 will be in elevated feeding position and the bar 99 will be in inactive position. In Fig. 26 it will be noted that the feed dog 52 will pass by the box head $j$, since the feeding lug 61 has been positioned 120 degrees away from its feeding position, so that on this forward movement of the feed mechanism only the bottom boards $c$ and $d$ will be moved into nailing position over the partly formed box in the holding forms 71, the indexing operation explained having placed the box parts in position for receiving the bottom, the completed feeding operation of which is indicated in Fig. 27. As soon as the bottom boards are released in nailing position the several operative steps of the machine as described in connection with the nailing and indexing will be repeated and as the feed mechanism begins its second return movement the ratchet 62 on the bottom head feed dogs will again engage the repositioning plunger 64 and the head dogs will be again moved rotatively through a path of 60 degrees as is indicated in Figs. 28 and 29, while Fig. 30 indicates the next operative position of the feed devices, placing the lifting roller 60 under the lifting plunger 59 brings the last side feed bar dogs into operative position and permits the bottom feed bar 100 to assume its idle position. The feed bar for moving the last side into nailing position is indicated at 101, and Fig. 31 shows the feed parts in position to begin the next and last forward movement in connection with this first box. As the feed mechanism moves forward the head board $j$ will remain in the feed chute as the feed lug 61 has not yet reached a point where it can engage the edge of this board. The side feed bar 101 being in elevated position the dogs on this bar will engage the side boards $e$ and $f$ and forward them to the positions of Fig. 32, thus placing them in nailing position, when the nailing operation will be repeated as previously described. The feed mechanism on the next return stroke will have the head dogs turned through another path of 120 degrees when the lugs 61 on the dogs 52 and 53 will be brought around to the position of Fig. 20 and the operations of feeding box heads and the first side parts will be repeated. The last repositioning of the feed dogs is illustrated in Figs. 33 to 35 and will occur in the same manner as before described. This sequence of operation is repeated continuously so long as this size and type of box is being made.

The placing of box heads in the head chutes needs no especial care except to get them in proper planes for the first position. The placing of sides and bottoms in the upper magazine requires that the proper boards alternate in proper order so that they will appear into nailing position in the correct sequence.

Having finished the first box the next operation in order is to see that it is ejected from the machine to give place for the following parts for another box.

This operation is best illustrated in Fig. 16.

Here the finished box is shown as fully removed from the box holding forms 71 and the box forms in transit to a position to receive the first parts for another box as they are shown approaching in Fig. 17.

As the head boards are moved forward into the holding forms 71 the remaining boards in the head chutes will move into feeding position where the top edges will rest against the inner faces of the feed brackets 54, the spring presser shoe acting to hold them back so they will not bear too heavily on this part and interfere with the free movement thereof.

I have also provided compensating means for the head feed devices. The head boards will vary some in width or length and as the forward edge of the boards as fed into the forms 71 come up against a positive stop any excess length will of course be absorbed on the back edge where the feed dogs are in contact. If the feed was at all rigid any excess length in the head boards would produce undesirable strain in the feed mechanism. To compensate for this the feed block 46 carries a feeding slide 46' that is cushioned with the spring 46", the position of the feed arm is set so that this spring flexes slightly each time a head board is fed.

The operation of indexing the mechanism for making a box such as has been described contemplates turning the box holding forms through arcs of 90 degrees for two of the operations and turning the forms through an arc of 180 degrees for the other operation. These operations are most fully illustrated in Figs. 13 to 17 inclusive.

Fig. 13 represents the position of the box holding forms 71 as described for the beginning of the operation of making a box and is the same as is shown in Fig. 5. It will be noted in this view that the notch of the indexing disk 77 opposite the bottom of the holding forms 71 is closed with a block 77$^a$ and is on the right of the view. In Fig. 14 the box forms have been moved 90 degrees to the next position of operation where the bottom boards $c$ and $d$ are fed into nailing position and the closed notch 77$^a$ is located toward the top of the view. Fig. 15 shows the box forms as turned another 90 degrees and have just received the last sides into nailing position and the closed notch 77$^a$ is on the left of the view. From this position the finished box is ejected as shown in Fig. 16 and now that the box forms are empty it is necessary to turn them through an arc of 180 degrees so as to reposition them into the beginning of an operation the same as Fig. 13. The purpose of the closed notch is now apparent. On account of the closed notch the disk 77 is unable to engage the T head plunger and become locked so that it simply rides around until the next notch is presented to the plunger when indexing takes place and the forms are in position for the beginning of the next operation and to receive a set of new box parts as is shown in Fig. 17 in which the forms are back into the position of Figs. 13 and 5.

Since all of the parts, chutes and magazine and the feed devices are mounted on the brackets 44 Figs. 2, 4 and 5 and these brackets are in turn mounted on the cross bars 43, adjusting facilities are provided for adjusting the parts to accommodate the handling of box parts for any size box within the capacity of the machine. To make this adjustment easy and accurate there is provided a right and left threaded adjusting screw 44' which is actuated through the medium of the squared ends of the screw. To accommodate differing size head boards the head guide brackets 47 are adjustable vertically on the brackets 44, and as the lower head feed dogs 53 are adjustable on the feed shafts 51 this member is easily kept in operative alignment with the repositioning plungers 64, 65 and 66 which are mounted on the under side of the guide brackets 47.

All of the foregoing description had reference to the making of a box whose depth is greater than half its width. I will now describe the making of boxes where the depth of each box is less than its width, and in which operation I am enabled to have two boxes in the holding forms each alternate cycle of operation, and am thereby operating on two boxes at one time during these periods.

The operations for accomplishing these results are illustrated in Figs. 38 to 50 inclusive.

Referring first to Figs. 48 to 50. In beginning the operation of making this type of box it is desirable to have either an unfinished box in the machine left from the last operation or to remove the first side board from the magazine. Fig. 48 shows the operation as beginning with an unfinished box in the machine. If the operation is commenced without this unfinished box then the side board marked *m* should be removed from the feed mechanism after the machine is started. This may easily be done through turning the machine over by the use of the hand wheels shown in Figs. 1 and 3. Assuming that we begin with an unfinished box, the first feed movement will deliver the side boards *m* and *n* and the head board *o* of Fig. 48. The first nailing operation will secure these boards to the parts adjacent thereto and thus complete the box having the *m* board when it will be ejected from the forms in the same manner as has been described for the larger boxes.

The rotation of the forms through an arc of 90 degrees will place the forms in the position of Fig. 49, when the feed devices will deliver the bottom boards *p* and *q*, after nailing these in position the forms will again be turned through an arc of 90 degrees and the conditions of operation will be the same as Fig. 48, when the sides *r* and *s* and the heads *t* will be placed in position in the forms. The sequence of operations will be repeated so long as boxes of this type are being made.

The exact operations for producing these results will be more fully understood by reference to the diagrammatic views 38 to 45 inclusive. Fig. 39 shows the feed devices in position to move heads *o* and the sides *m* and *n* into the nailing positions of Figs. 38 and 48. The rollers 60 resting under the lifting plungers 56 will lift the side feed bars 99 into operative position to engage the sides *m* and *n* and move them into the position of Fig. 38. As the feed mechanism begins its return movement the ratchet teeth on the member 61 will engage with the resetting plunger 64 and be moved through an arcuate path of 60 degrees to the position of Fig. 41. In the operations on double boxes it becomes necessary to bring the resetting plungers 65 into operation and one of them is shown in Fig. 42, in this figure the feed dog head has been moved another 60 degrees and in passing the resetting plunger 66 it will be moved another 60 degrees when it will be in the position of Fig. 43 with the lifting roller 60 under the lifting plunger 58 which will cause the feed bar 101 to be lifted into operative position so that as the feed mechanism again moves forward the bottom boards *p* and *q* of Fig. 45 will be moved into the position of Fig. 44 which is the equivalent of Fig. 49. The feed head dogs during this sequence of operations having moved through a path of 180 degrees, will upon a repetition of this sequence be repositioned to that of Fig. 39, which will begin the operation of Fig. 50. It will be observed that the lifting plunger 58 of the side feed mechanism is brought into play when making these smaller boxes and the plunger 59 is used for lifting the same bar when making the larger boxes, the 58 plunger lifting a bottom bar while the 59 plunger lifts a side bar.

The construction of the side bar dogs is clearly shown in Figs. 46 and 47. End blocks 102 are held in spaced alignment by means of side strips 103 riveted or screwed thereto.

In the space between the end blocks are positioned the feed bars 99, 100 and 101 for the larger box and the bars 99 and 100 in the case of the smaller boxes. The engaging lugs on the bars are spaced according to the width of side or bottom boards being used, the spaces between the boards when two are used for a side or bottom being just sufficient to permit the feed lug to engage the edge of the board. The side plates 103 are cut away at 103ª to permit the heads of the lifting plunger to engage the bars and hold them in position during the feed movement. The feed bar unit is held in the feed bracket 54, Figs. 18 and 19 by means of the pilot screw 54' entering the hole 103ᵇ of the side bar 103. This simple and effective means of attachment makes changes very easily accomplished.

What I claim as new and desire to secure by Letters Patent is:—

1. In a machine for the purpose described, the combination of storage magazines for containing a supply of box parts, rotatable box parts holding forms for receiving parts from said magazine, nailing means for uniting box parts while held by said forms, indexing mechanism for repositioning said rotatable box parts holding forms in a plurality of successive positions during each cycle of operation in making a box, and means for selectively feeding box parts to the forms from the magazines at the beginning of an operation in each successive position of said holding forms.

2. In a machine for making boxes, the combination of magazines for containing a supply of box ends, a magazine for containing a supply of box sides and bottoms, box parts holding forms, reciprocating means for transferring in proper sequence, box ends, box sides and box bottoms from said magazines to said holding forms, nailing means for securing box parts together as successively supplied to said holding forms, and indexing means for said holding forms directly and intermittently operated by the nailing mechanism for rotating and repositioning said forms during the formation of the boxes so as to successively present the sides and bottoms of the boxes to the nailing mechanism.

3. In a machine for making boxes, the combination of storage magazines for containing a supply of box parts, box parts holding forms, directly connected nailing means and indexing means for controlling the positioning of said holding forms during each cycle of operation, and transferring mechanism for successively moving box parts from said magazines to said holding forms in the following order, first moving box ends and sides, second moving box bottoms and third moving box sides.

4. An automatic machine for making boxes, comprising forms for holding box parts in assembled relation, a support for said forms in one position, automatic means for placing box parts in said forms, reciprocating anvil means and reciprocating nail driving means moving in opposed relation, one of said reciprocating means acting as a support for the said box forms during the period of operating thereon and for transferring said forms to the first-mentioned support during the period of nonoperation, and indexing means connected with said box form for rotating and indexing the position of said forms for each cycle of operating period.

5. An automatic machine for making boxes from previously cut parts, comprising box holding forms adapted to hold box parts in assembled relation and mounted for rotation and reciprocatory movement, automatic means for placing box parts in said holding means, a movable support for said holding forms during the periods of operation, fixed supports for said holding forms during the periods of rest, and automatic controlling means for bringing said parts into a new operative position.

6. A machine for making boxes from previously cut box parts, comprising box parts holding means mounted for rotation on a horizontal axis and for reciprocation in a vertical plane, automatic means for placing box parts in said holding means, nail supplying and nail driving means, indexing means operated by the nail driving means for bringing the different planes of ununited box parts within the operative zone of said nailing means, and means for ejecting a finished box from said machine.

7. A machine for uniting previously formed box parts comprising means for holding said parts in assembled relation, said means being mounted for axial rotation and vertical reciprocation, automatic feed means for placing box parts in said holding means, indexing means mounted in fixed relation to said holding means and movable therewith, anvil means and nail driving means movable on opposite sides of said holding means and adapted to engage said holding means and unite said assembled box parts, said anvil means and said driving means then moving away from said box parts holding means, and connections for imparting both rotary and reciprocative movement to said holding means, whereby said holding means is repositioned to present another plane of the forming box to the action of said nail driving means during the next cycle of operation.

8. A machine for uniting assembled box parts comprising box parts holding forms mounted for placement in two different planes during each cycle of operation, automatic means for placing box parts in said holding forms, anvil means adapted to move said holding forms from a lower to an upper plane of location during a cycle of operation, and indexing means adapted to reposition said holding means during its period of movement in a lower plane.

9. A machine for uniting assembled box parts comprising box parts holding forms mounted for both rotary and vertical displacement and adapted to occupy two different planes of location during each cycle of operation, automatic means for placing box parts in said holding means, indexing mechanism directly connected with said holding means for positioning said holding forms for a subsequent operation during the final stages of each cycle, and friction drive means for operating said indexing mechanism.

10. A machine for uniting assembled box parts comprising box parts holding forms mounted for both rotary and vertical displacement and adapted to occupy two different planes of location during each cycle of operation, automatic means for placing box parts in said holding means, anvil means for moving said holding forms from one plane of location to the other plane of location and returning them to the first plane of location, and friction devices controlling indexing mechanism for repositioning said holding forms for a subsequent operation before said holding forms are returned to the said first plane of location.

11. A machine for uniting assembled box parts comprising box parts holding forms mounted for both vertical and rotary displacement, automatic means for placing box parts in said holding forms, reciprocating box nailing means operating in opposed relation on opposite sides of said box parts holding forms, the reciprocation of said nailing means effecting the vertical displacement of said holding forms, and frictionally controlled indexing means for effecting the rotary displacement of said holding forms, both of these displacements occurring in each cycle of operation whereby the said box holding forms are positioned for a subsequent operation during each cycle.

12. A machine for uniting assembled box parts comprising box parts holding means mounted for placement in two different planes of location during each cycle of operation, automatic means for placing box parts in said holding means, box nailing means for operating on box parts in one plane of location, indexing means for repositioning said box parts during their occupancy of the other plane of location, said indexing means comprising a notched member, and a permanently located notch engaging member.

13. A machine for uniting assembled box parts comprising box parts holding forms mounted for rotation, automatic means for placing box parts in said holding forms, box nailing means for operating on box parts while in the control of said holding forms, indexing mechanism for repositioning said box parts after each nailing operation, said indexing mechanism comprising friction drive means, a permanently located notch engaging indexing member, and a notched disk operating in conjunction therewith.

14. A machine for uniting assembled box parts comprising box parts holding means mounted for both rotary and vertical displacement and adapted to occupy two different planes of location during each cycle of operation, automatic means for placing box parts in said holding means, box nailing means adapted to move said holding means from one plane of location to the other plane of location and return the same to the first plane of location, frictionally controlled indexing means for repositioning said holding means while resting in one of said planes of location, said indexing means comprising a notched indexing disk, and a permanently located notch engaging member.

15. A machine for uniting assembled box parts comprising a base member and vertical spaced housings for supporting and guiding box parts holding means and nailing means, a horizontal shaft supporting said holding means, and automatic means for placing box parts in said holding means, said shaft and said holding means being mounted for both rotary and reciprocatory motion through fixed planes within said vertical housings, and said nailing means being also adapted to vertical reciprocation within said vertical housings and adapted to operate on box parts during each cycle of operation.

16. A machine for uniting assembled box parts comprising a base member and vertical housings, box parts holding means and box nailing means each supported by said housings, said box holding means being disposed on a horizontal axis, having both rotary and reciprocatory movement within said housings, said nailing means having vertical movement within said housings and adapted to operate on box parts at the end of one of said movements, frictionally operated indexing means for repositioning said box parts holding means after each nailing operation, and means adjustably mounted on said housings for supplying box parts in proper sequence to said box parts holding means.

17. A machine for nailing assembled box parts comprising a drive shaft, cams on said shaft, nailing anvils operated by the cams on said drive shaft, box parts holding forms mounted to be supported in nailing position by said nailing anvils, automatic means for placing box parts in said holding forms, nailing means adapted to operate on box parts on said forms while said forms are being supported by said anvils, and indexing mechanism adapted to reposition said box forms for a subsequent operation when the support of said anvils is removed therefrom.

18. A machine for nailing assembled box parts comprising a drive shaft, cams on said shaft, nailing anvils mounted to be operated by said cams, box parts holding forms mounted to be supported in nailing position by said nailing anvils, nailing means adapted to operate on box parts while said forms are being supported by said anvils, friction controlled indexing mechanism adapted to reposition said box forms for a subsequent operation when the support of said anvils is removed therefrom, means for imparting motion to said friction controlled indexing mechanism, and automatic means for placing box parts in said box parts holding means.

19. A machine for nailing assembled box parts comprising a drive shaft, cams on said shaft, nailing anvils mounted to be operated by said cams, box ejector means mounted adjacent said shaft, cams on said shaft for operating said ejector means, box parts holding forms mounted for temporary support by said nailing anvils, automatic means for placing box parts in said holding forms, nailing means for operating on box parts while supported by said anvils, indexing means for repositioning said forms for a subsequent operation, and power means for operating said parts in timed relation.

20. A machine for uniting assembled box parts comprising a drive shaft, cams on said shaft, a supporting frame moved by said cams, nailing anvils mounted for lateral adjustment on said supporting frame, box parts holding forms mounted for rotation adjacent said anvils, automatic means for placing box parts in said holding forms, nail driving means mounted for reciprocation opposite said anvils, and registering mechanism for controlling the positioning of said holding forms relative to said anvils and said nailing means.

21. A machine for uniting assembled box parts comprising nailing anvils moving through the medium of suitable cam mechanism, rotary box parts holding members mounted for moving support during a part of an operative cycle and for fixed support during an idle period, automatic means for placing box parts in said holding members, nail driving means mounted for movement adjacent said holding members, and registering means for controlling the positioning of said holding members relative to said anvils and said nail supplying means.

22. In a machine for making boxes, box parts holding forms, friction operated index means for rotating said holding forms to reposition box parts held thereby, nailing means for uniting box parts while held by said holding forms, feed means for moving box parts to said forms in proper sequence to produce rectangular boxes, and means for manipulating said feed means whereby said movement of box parts in proper sequence is maintained.

23. In a machine for making boxes, box parts holding forms adapted to occupy two different planes of location during each cycle of operation, nailing means for securing box parts together while said forms are occupying one of said planes of location, means operated by the nailing means for repositioning said forms while they are occupying the other plane of location, feed means for moving box parts to said forms in proper sequence to produce open top rectangular boxes, and means for manipulating said feed means whereby said movement of box parts in proper sequence is maintained.

24. In a machine for making boxes, box parts holding forms adapted to occupy two different planes of location during each cycle of operation, means for securing box parts together while said forms are occupying one of said planes of location, friction controlled operating means for repositioning said box forms while they are occupying the other plane of location, feed means for moving box parts to said holding forms in proper sequence to produce open top rectangular boxes, and means for manipulating said feed means whereby said movement of box parts in proper sequence is maintained.

25. In a machine for making boxes, box parts holding forms adapted to occupy two planes of location during each cycle of operation, nailing means for securing box parts together during the time said holding forms are occupying one plane of location, friction controlled indexing mechanism for repositioning said box parts while said forms are occupying the other plane of location, reciprocative feed means for moving box parts to said holding means, and interruptive means for manipulating said feed means whereby box ends and one side are moved into position during one cycle of operation and the bottom and other side during the next two cycles of operation.

26. In a machine for making boxes, box parts holding forms, means for rotating said forms to reposition box parts held thereby, means for uniting box parts while held by said forms, reciprocating feed means for moving box ends and box sides and bottoms to said holding forms in proper sequence to form open top boxes, rotary manipulative means carried by and movable with the feed means for placing the end feed means out of feeding position and permitting the side and bottom feed means to continue in feeding position during each operative period to complete one box and setting means for the rotary manipulative means.

27. A machine for making boxes comprising box parts holding forms, nailing means, feed means for placing box parts in said holding forms, said feed means comprising separate devices for moving the several components of a box into nailing position, rotary operating means for selectively placing said separate feed devices into and out of operative relation in such order that the several box parts are placed into nailing position in proper sequence, and stationary means for operating said rotary operating means.

28. A machine for making boxes comprising box parts holding forms, means for rotating said forms, nailing means for securing box parts together while held by said forms, feed means for placing box parts in said forms, said feed means comprising separate devices for moving the several components of the box into nailing position, rotary operating means for automatically operating said several separate feed devices in such order that the several box parts are placed in nailing position in proper sequence, and a plurality of setting elements for rotating said rotary operating means in predetermined sequence.

29. A machine for making boxes comprising box parts holding forms, friction controlled operative means for rotating said forms, nailing means for securing box parts together while held by said forms, feed means for placing box parts in said forms, said feed means comprising separate devices for moving the several components of a box into nailing position, and operative means for automatically placing said several separate feed devices into and out of operative relation in such order that the several box parts are placed into nailing position in proper sequence.

30. A machine for making boxes comprising box parts holding forms, nailing means for securing box parts together while in the control of said forms, magazines containing a supply of box parts, a three cycle reciprocating feed means adapted to select box parts from said magazines and place them into nailing position in said holding forms in the following order, box ends and one side during the first cycle, box bottoms during the second cycle, and the remaining side during the third cycle, rotary means for operating said feed means movable therewith, and controlling and operating means for the rotary means.

31. A machine for making open top rectangular boxes comprising box parts holding forms, nailing means, magazines for containing a supply of box parts, horizontally disposed feed means for selecting box sides and bottoms from one of said magazines, vertically disposed feed means for selecting box ends from the other of said magazines, said feed means being reciprocable for moving said box parts as selected into said holding forms, rotary means for manipulating all of said mentioned feed means to select said box parts in proper sequence, and control means for said rotary means adapted to govern the selecting operation of the feed means.

32. A machine for making boxes comprising box parts holding forms, nailing means, magazines for containing a supply of box parts, a plurality of horizontally disposed feed means lying in adjacent parallel relation for selecting box sides and box bottoms from one of said magazines, vertically disposed feed means for selecting box ends from the other of said magazines, said feed means moving said box parts as selected into said holding forms, means for manipulating said plurality of horizontally disposed feed means for successively selecting sides and bottoms, and means for manipulating said end feed means for selecting box ends only at the beginning of an operation on a box.

33. A machine for making boxes comprising box parts holding forms, nailing means, magazines for containing a supply of box parts, feed means for placing box parts in said holding forms, part of said feed means comprising a series of feed bars lying in parallel relation and each resting in an elevated plane during its operative period, said feed means being adapted to move box sides and bottoms into nailing position, and other feed means for moving box ends into nailing position at the beginning of each operation on a box.

34. A machine for making boxes comprising box parts holding forms, nailing means and magazines for containing a supply of box parts, co-acting re-ciprocating feed devices for selecting box parts from said magazines and placing them into said holding forms, the feed devices for selecting the sides and bottoms lying in a horizontal plane, the feed devices for selecting the ends lying under said side and bottom feed devices, and operating means for successively placing said sides and bottom feed devices in operative positions to select and feed box sides and bottoms in proper sequence.

35. A machine for making boxes comprising box parts holding forms, nailing means, magazines for containing a supply of box parts, and feeding means for selecting box parts from said magazines and placing them in said holding forms, said feeding means comprising horizontally disposed feed bars and vertically disposed feed heads, said feed bars being placed into feeding position through the rotary action of said feed heads while said feed heads are being manipulated during the several cycles of operation on a single box.

36. A machine for making boxes comprising box parts holding forms, nailing means, magazines for containing a supply of box parts, feeding means for selecting box parts from said magazines and placing them in said holding forms, said feeding means comprising feed bars mounted for vertical movement, and rotary feed means mounted underneath said feed bars and carrying means for lifting said feed bars into feeding position.

37. A machine for making boxes comprising box parts holding forms, nailing means, magazines for containing a supply of box parts, feeding means comprising vertically and horizontally movable feed dogs for moving box sides and bottoms into said holding forms, and rotatable and horizontally movable means for feeding box heads or ends into said holding forms.

38. A machine for making boxes comprising box parts holding forms, nailing means, magazines for containing a supply of box parts, feeding means comprising vertically and horizontally movable feed devices for feeding box sides and bottoms into said holding forms, rotatable and horizontally movable feed means for feeding box heads or ends into said holding forms, and means carried by said rotatably movable feed means for imparting vertical movement to said vertically movable feed means.

39. A machine for making boxes comprising box parts holding forms, nailing means, magazines for containing a supply of box parts, feed means comprising horizontally disposed feed bars normally lying out of operative position, rotary means successively engaging movable means for bringing said feed bars into operative position whereby box parts are moved into nailing position, said feed means being reciprocable during operation, and means for imparting step by step rotation to the rotary means.

40. A machine for making boxes comprising box parts holding forms, nailing means, magazines for containing a supply of box parts, feed means comprising a series of feed bars normally lying out of operative position and mounted for both horizontal and vertical movement and supported over a series of lifting plungers, and rotary means for successively lifting said plungers and thereby lifting said feed bars into operative positions.

41. A machine for making boxes comprising box parts holding forms, nailing means, magazines for containing a supply of box parts, reciprocating feed means comprising feed bars for feeding box sides and bottoms and normally lying out of operative positions, rotary feed dogs for feeding box ends, and coacting means between said feed bars and said feed dogs whereby rotary movement of said feed dogs raises said feed bars into operative positions.

42. A machine for making boxes comprising box parts holding forms, nailing means, magazines for containing a supply of box parts, feed means comprising a separate feed bar for each side and a bottom of a box, each normally lying out of operative position, a separate positioning member for contacting with each feed bar, and rotary means for successively actuating said positioning members whereby said feed bars are successively brought into operative feed positions.

43. A machine for making boxes comprising box parts holding forms, nailing means, magazines for containing box parts, feeding means for moving box parts into nailing positions comprising a series of feed bars mounted for vertical movement, a series of feed dogs mounted for rotary movement, and devices for engaging said feed bars and said feed dogs and successively moving them into and out of operative positions in successive steps during the operations on each box.

44. A machine for making boxes comprising box parts holding forms, means for rotating and repositioning said holding forms once during each cycle of operation, feeding means for moving box parts into said holding forms comprising a series of feed bars mounted for vertical movement and a series of feed dogs mounted for rotary movement, and devices for imparting both vertical and rotary movements to said feed devices in successive steps during each cycle of operation.

45. A machine for making boxes comprising box parts holding forms, friction operated means for rotating and repositioning said holding forms, feeding means for moving box parts into said holding forms comprising a series of feed bars mounted for vertical movement and a series of feed dogs mounted for rotary movement, and devices for imparting both vertical and rotary movements to said feed devices in successive steps during each cycle of operation.

46. A machine for making boxes comprising box parts holding forms mounted for both vertical and rotary movement, means for imparting both vertical and rotary movement to said holding forms, feeding means for moving box parts into said holding forms comprising feed bars mounted for vertical movement into operative position, feed dogs mounted for rotary movement into operative position, and devices coacting with said feed bars and said feed dogs for imparting both vertical and rotary movements thereto during each cycle of operation.

47. A machine for making boxes comprising box parts holding forms mounted for both vertical and rotary movement during each cycle of operation, vertical movable means and frictional controlled means for imparting vertical and rotary movements to said holding forms during each cycle of operation, feeding means for moving box parts into said holding forms comprising feed bars mounted for vertical movement into operative positions, feed dogs mounted for rotary movement into operative positions, and devices coacting with said feed bars and said feed dogs for imparting both vertical and rotary movements thereto during each cycle of operation.

48. A machine for making boxes comprising box parts holding forms, means for rotating and repositioning said holding forms once during each cycle of operation, nailing means for securing box parts together while held by said holding forms, feeding means for moving box parts into said holding forms comprising a series of feed bars mounted for vertical movement and a series of feed dogs mounted for rotary movement, and devices for imparting both vertical and rotary movements to said feed devices during each cycle of operation.

49. A machine for making boxes comprising box parts holding forms, friction controlled means for rotating said forms, nailing means for securing box parts together while in said forms, feeding means for moving box parts into said forms, and interrupting means for placing a part of said feed means out of operation during the feeding of box bottoms.

50. A machine for making boxes comprising box parts holding forms, means for rotating and repositioning said forms, nailing means, magazines for containing a supply of box parts, means for giving lateral and vertical adjustment to said magazines to accommodate box parts of varying sizes, and feed means for moving box parts from said magazines to said holding forms with adjustable feed parts to accommodate boxes of varying sizes.

51. A machine for making boxes comprising box parts holding forms having both vertical and rotary movement, means for imparting such movement to said holding forms, oppositely disposed nailing means having adjustment to accommodate differing size boxes, magazines for containing a supply of box parts, and feed means for moving box parts from said magazines to said holding means.

52. A machine for making boxes comprising box parts holding forms, nailing means, a magazine for holding box sides and bottoms in alternate superposed relation, and automatically adjustable feed means for successively selecting sides and bottoms and moving the same to said holding forms in proper sequence to permit of continuous operation on boxes by said machine.

53. A machine for making boxes comprising box parts holding means, means for rotating and repositioning said holding means comprising indexing mechanism for giving a ninety degree rotation to said holding means during two consecutive cycles of operation and a one hundred and eighty degree rotation every third cycle of operation, nailing means, and feed means for placing box parts in said holding forms.

In testimony whereof I have signed my name to this specification.

GEORGE D. PARKER.